Figure 29:
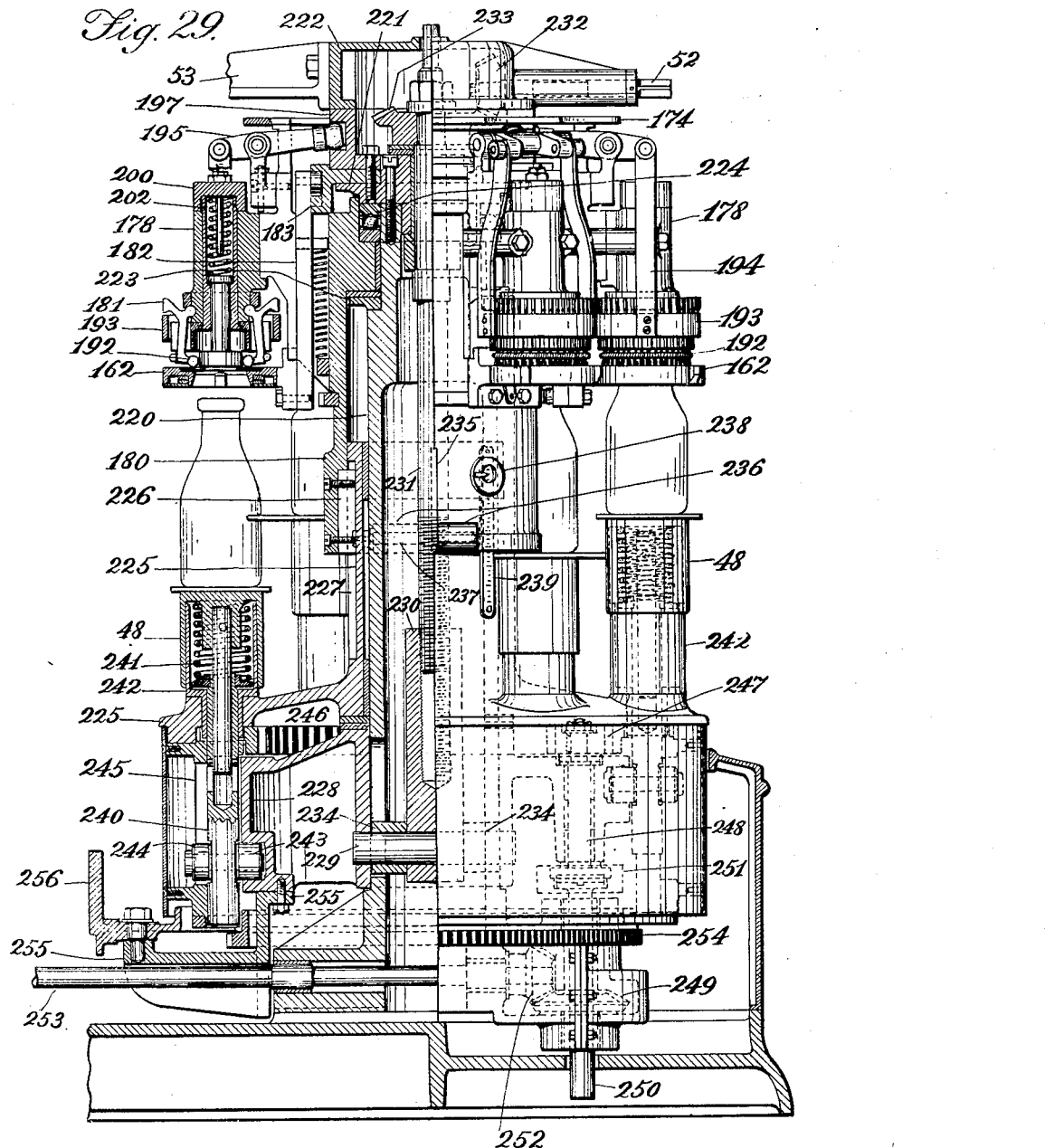

May 15, 1934.  R. E. RUNDELL  1,958,769
MACHINE FOR CRIMPING PLASTIC CAPS ON BOTTLES
Original Filed April 7, 1926   11 Sheets-Sheet 1
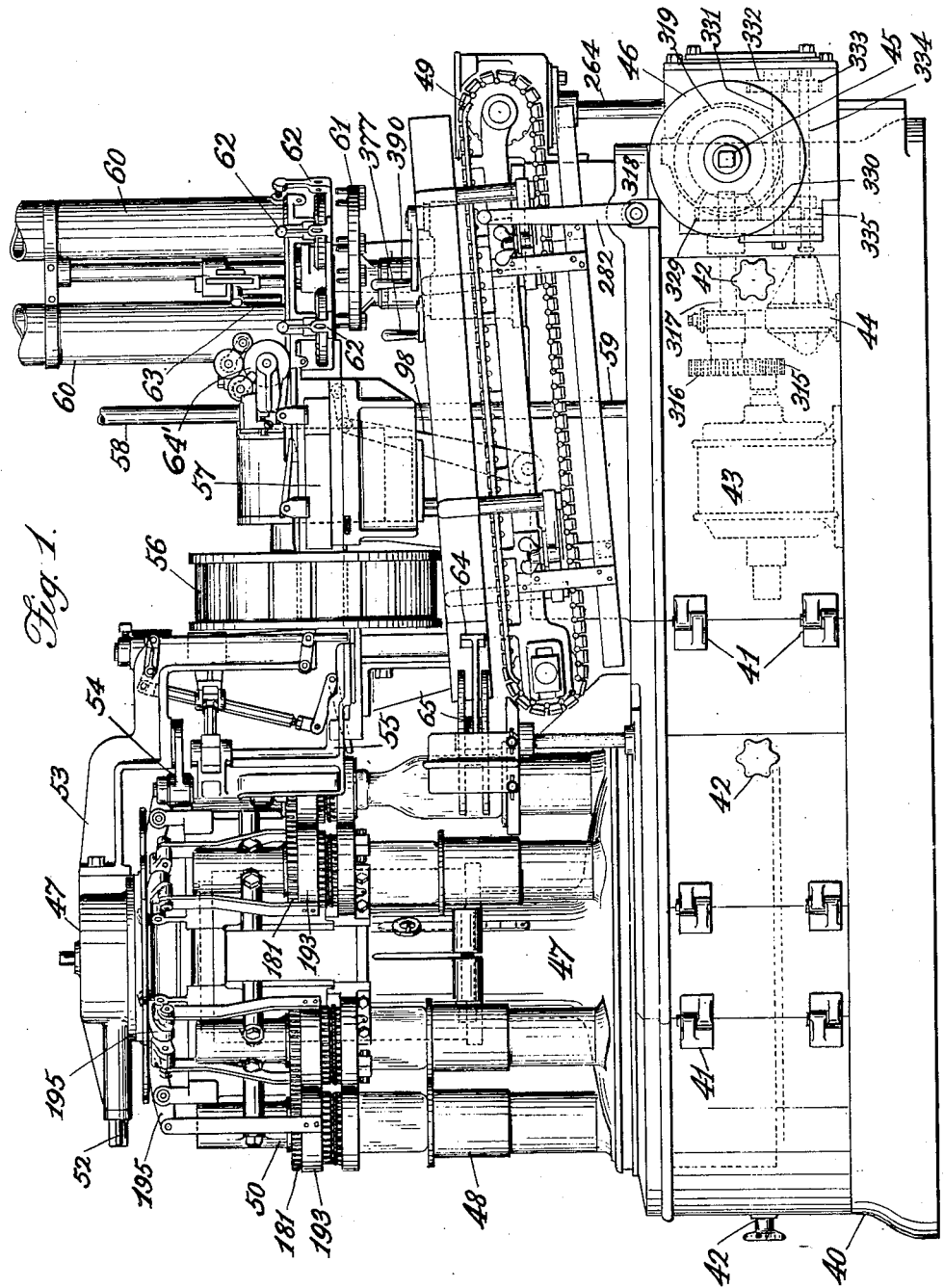
INVENTOR
Rupert E. Rundell
BY
Sydney J. Prescott
ATTORNEY

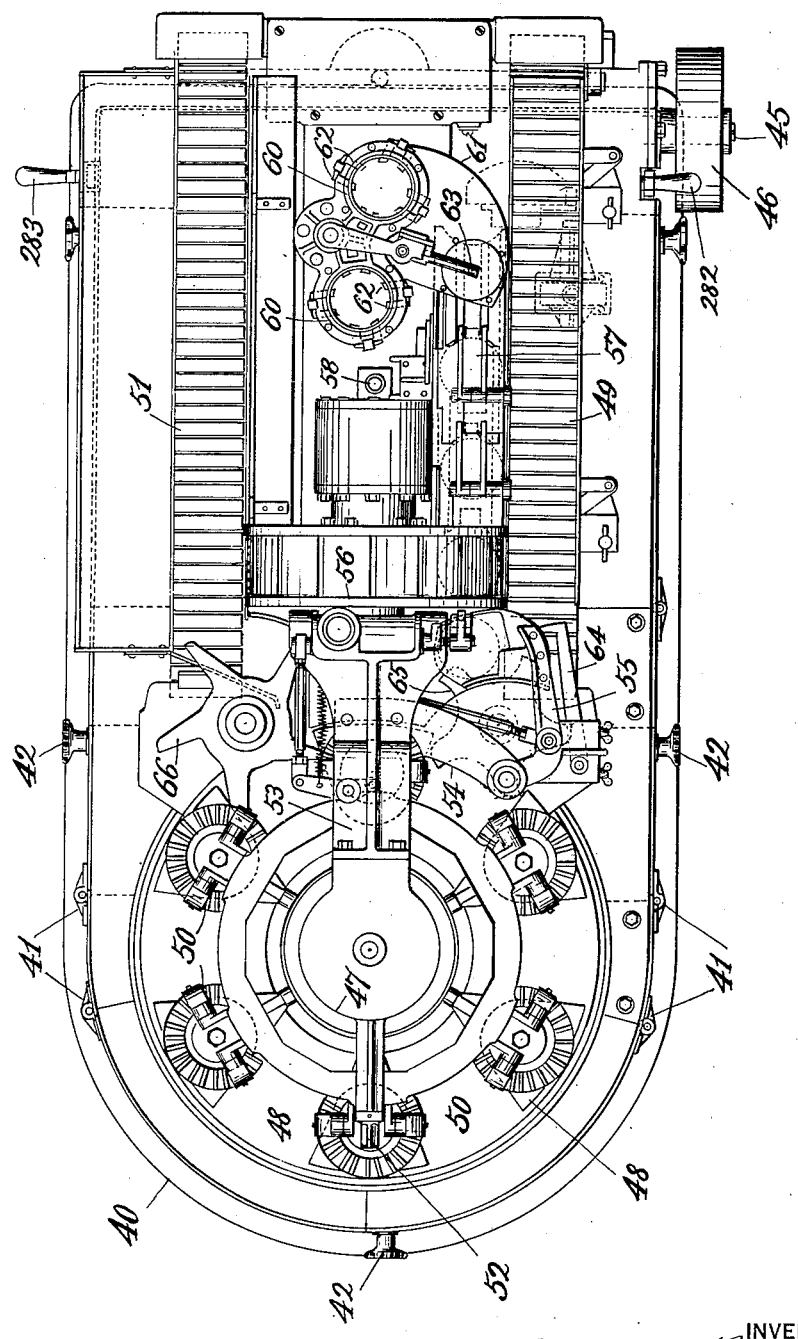

May 15, 1934.   R. E. RUNDELL   1,958,769
MACHINE FOR CRIMPING PLASTIC CAPS ON BOTTLES
Original Filed April 7, 1926   11 Sheets-Sheet 3
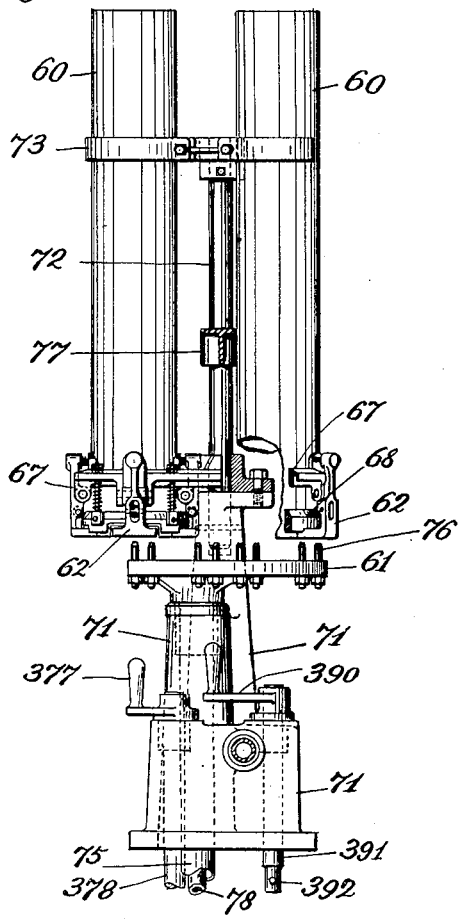
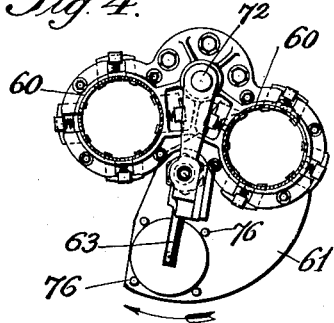
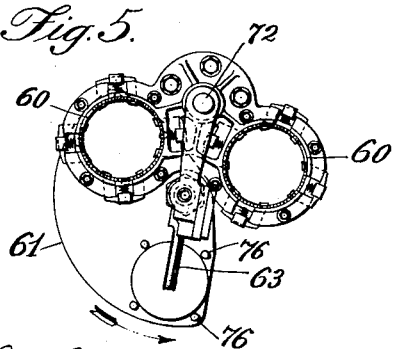
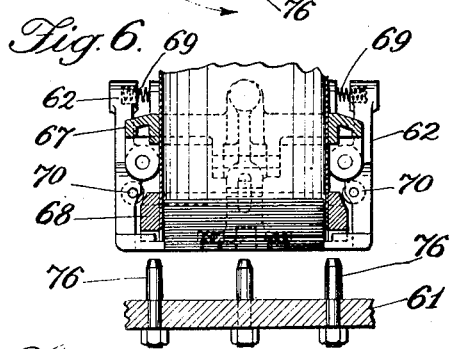
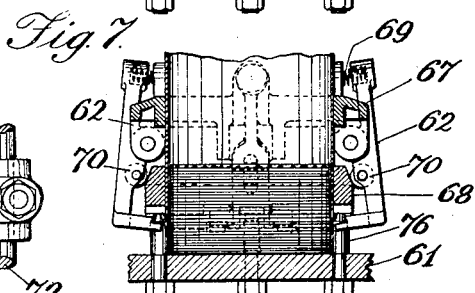
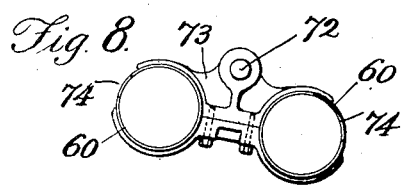
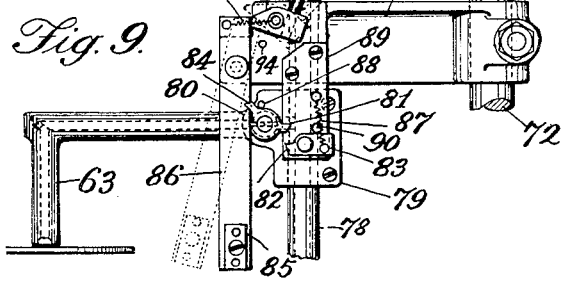
INVENTOR
Rupert E. Rundell
BY Sydney Prescott
ATTORNEY

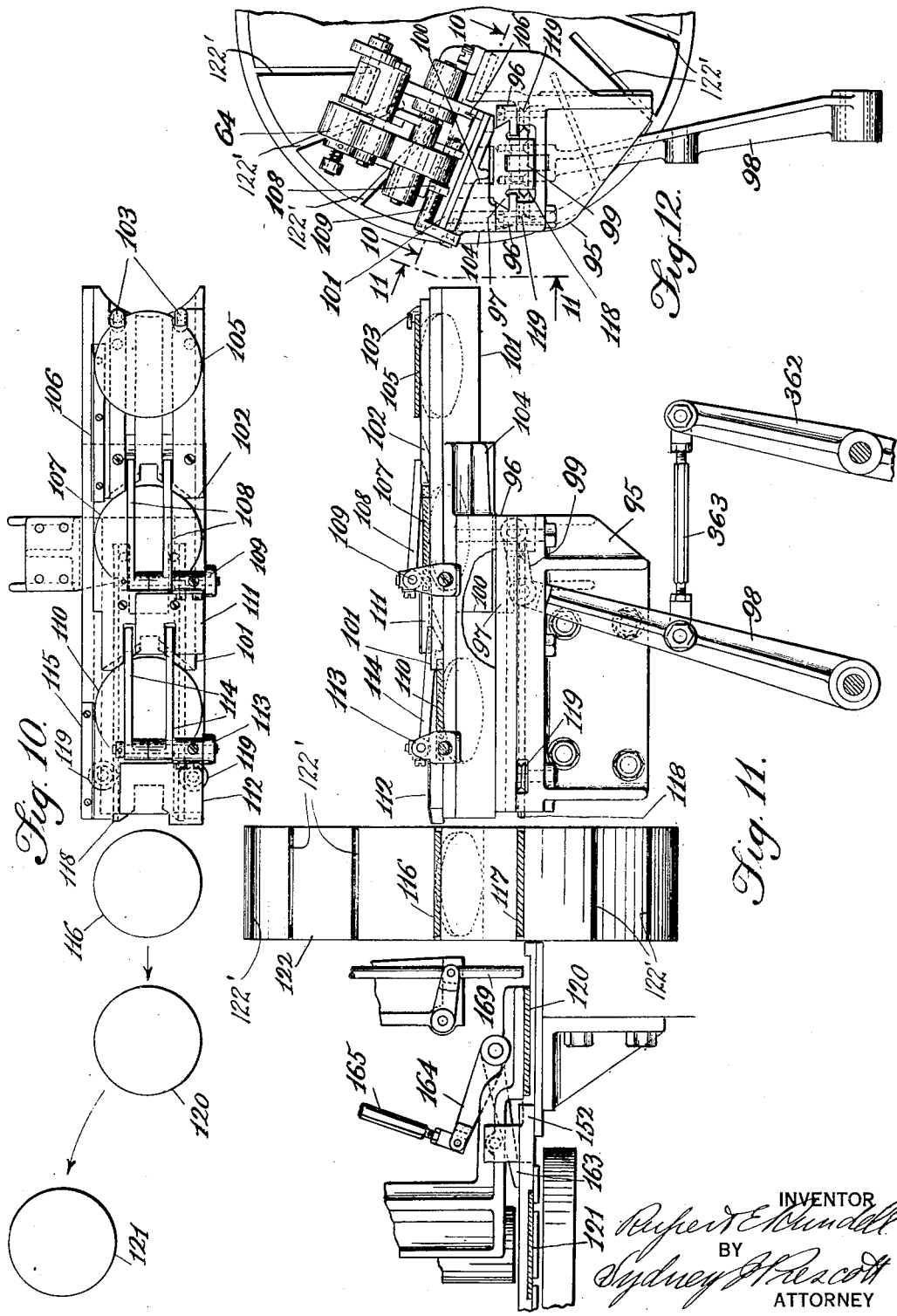

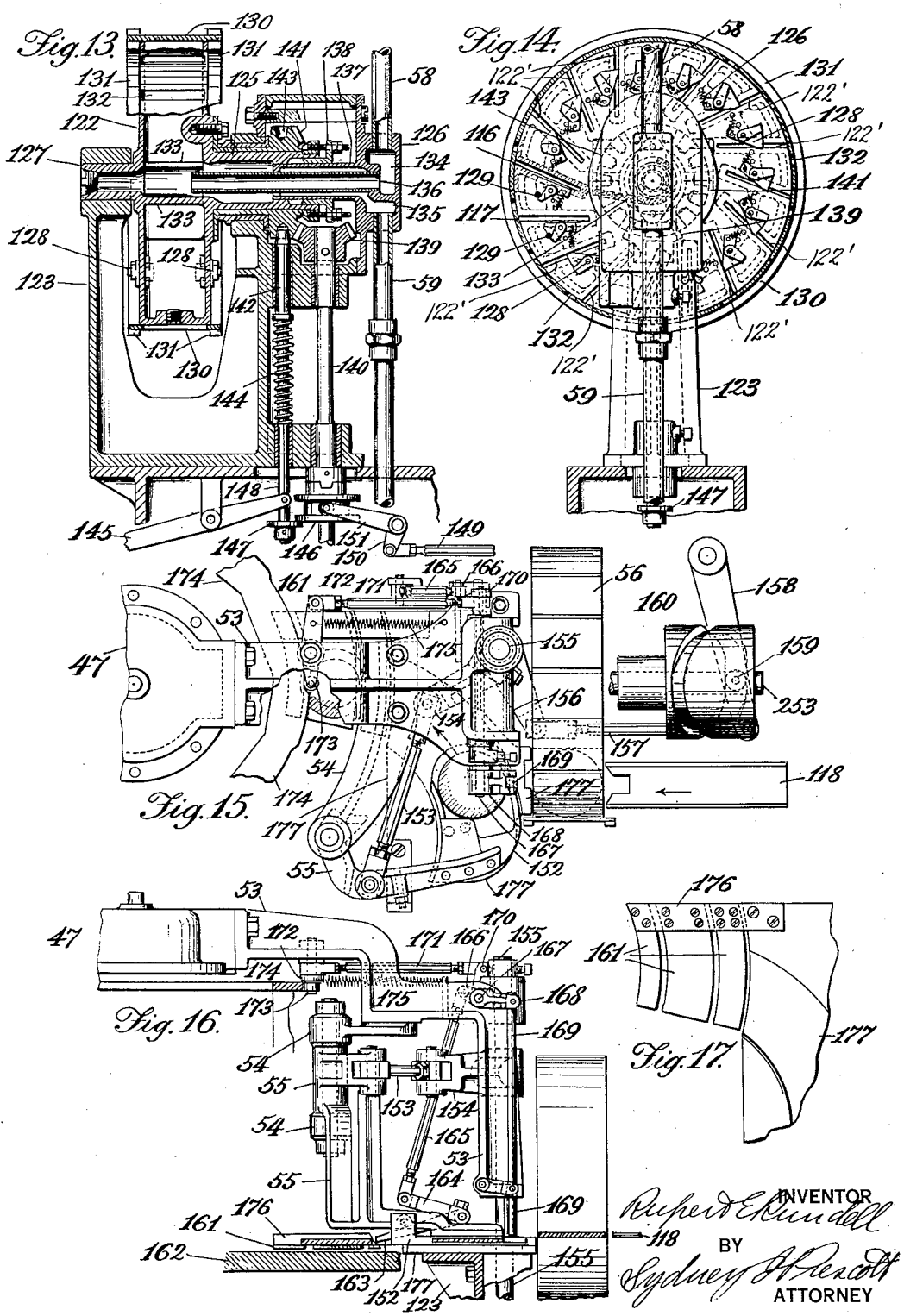

May 15, 1934.  R. E. RUNDELL  1,958,769
MACHINE FOR CRIMPING PLASTIC CAPS ON BOTTLES
Original Filed April 7, 1926  11 Sheets-Sheet 6
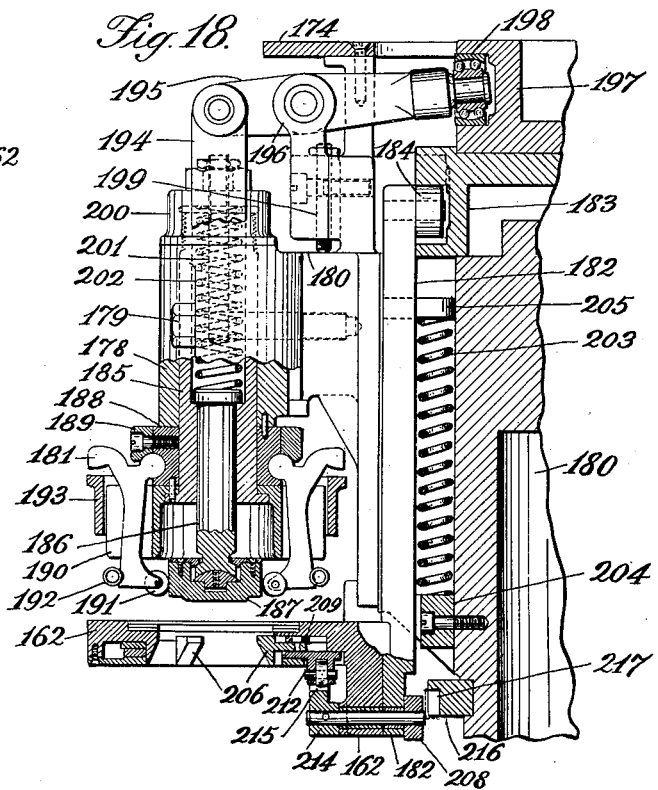
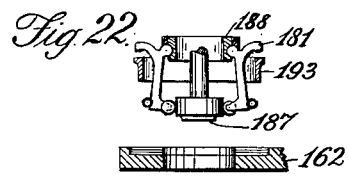
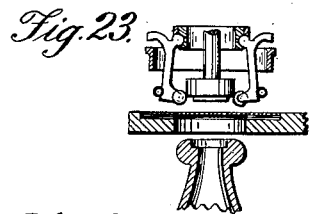
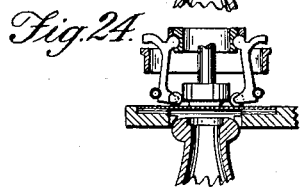
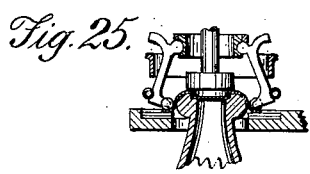
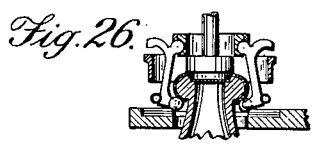
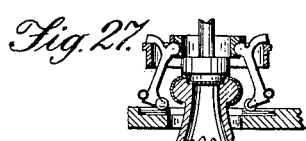
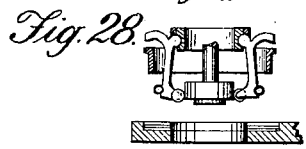
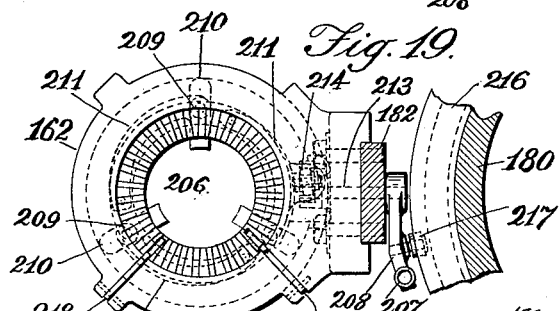
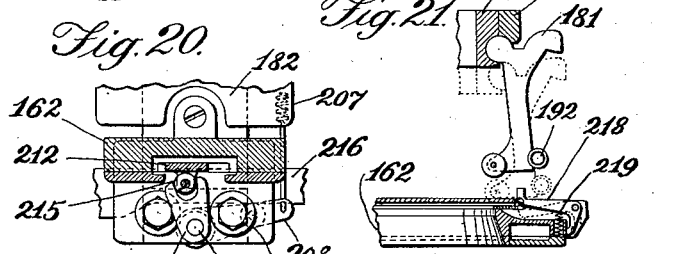
INVENTOR
Rupert E. Rundell
BY Sidney Prescott
ATTORNEY May 15, 1934.  R. E. RUNDELL  1,958,769
MACHINE FOR CRIMPING PLASTIC CAPS ON BOTTLES
Original Filed April 7, 1926   11 Sheets-Sheet 7

INVENTOR
Rupert E Rundell
BY
Sydney Prescott
ATTORNEY

May 15, 1934.  R. E. RUNDELL  1,958,769
MACHINE FOR CRIMPING PLASTIC CAPS ON BOTTLES
Original Filed April 7, 1926  11 Sheets-Sheet 8

INVENTOR
Rupert E Rundell
BY
Sydney Prescott
ATTORNEY

May 15, 1934.  R. E. RUNDELL  1,958,769
MACHINE FOR CRIMPING PLASTIC CAPS ON BOTTLES
Original Filed April 7, 1926   11 Sheets-Sheet 9
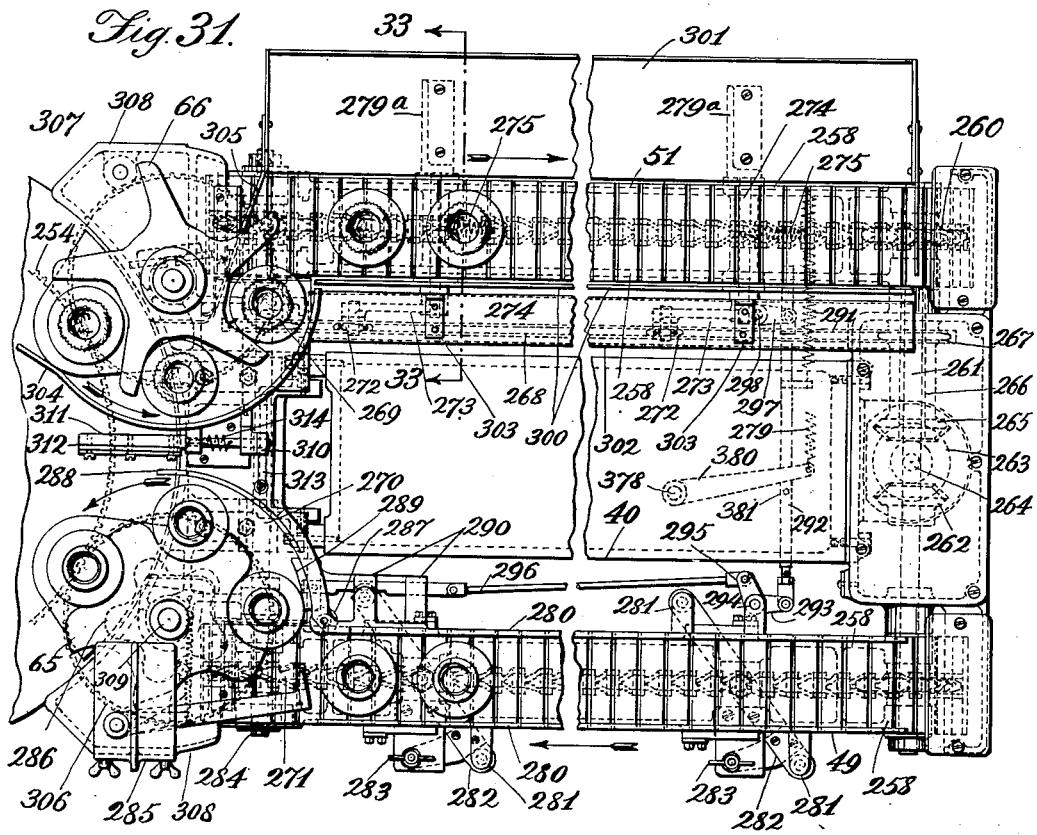
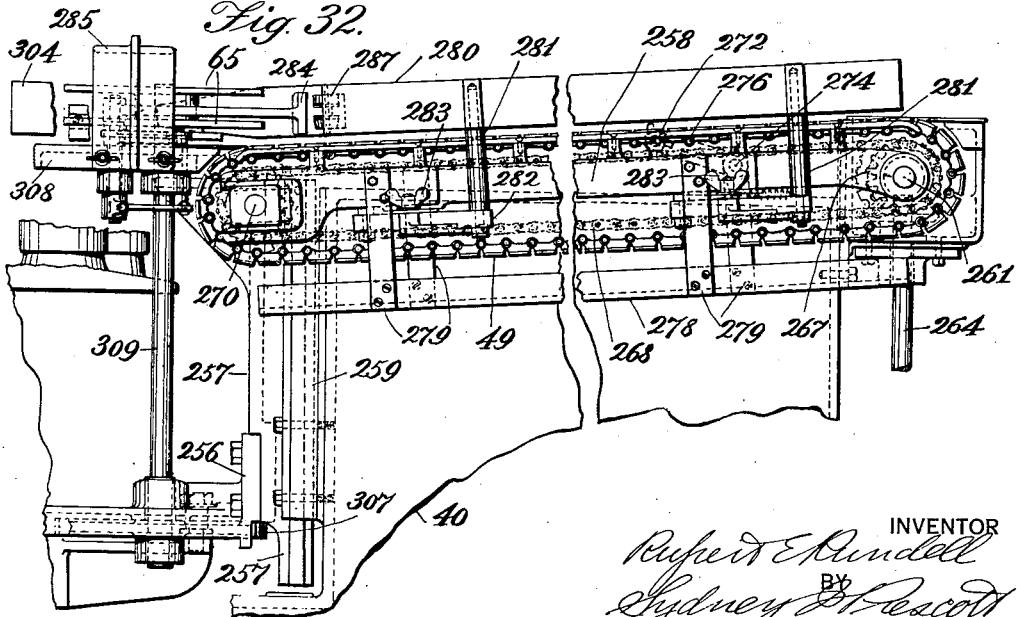
INVENTOR
Rupert E Rundell
BY
Sydney Prescott
ATTORNEY

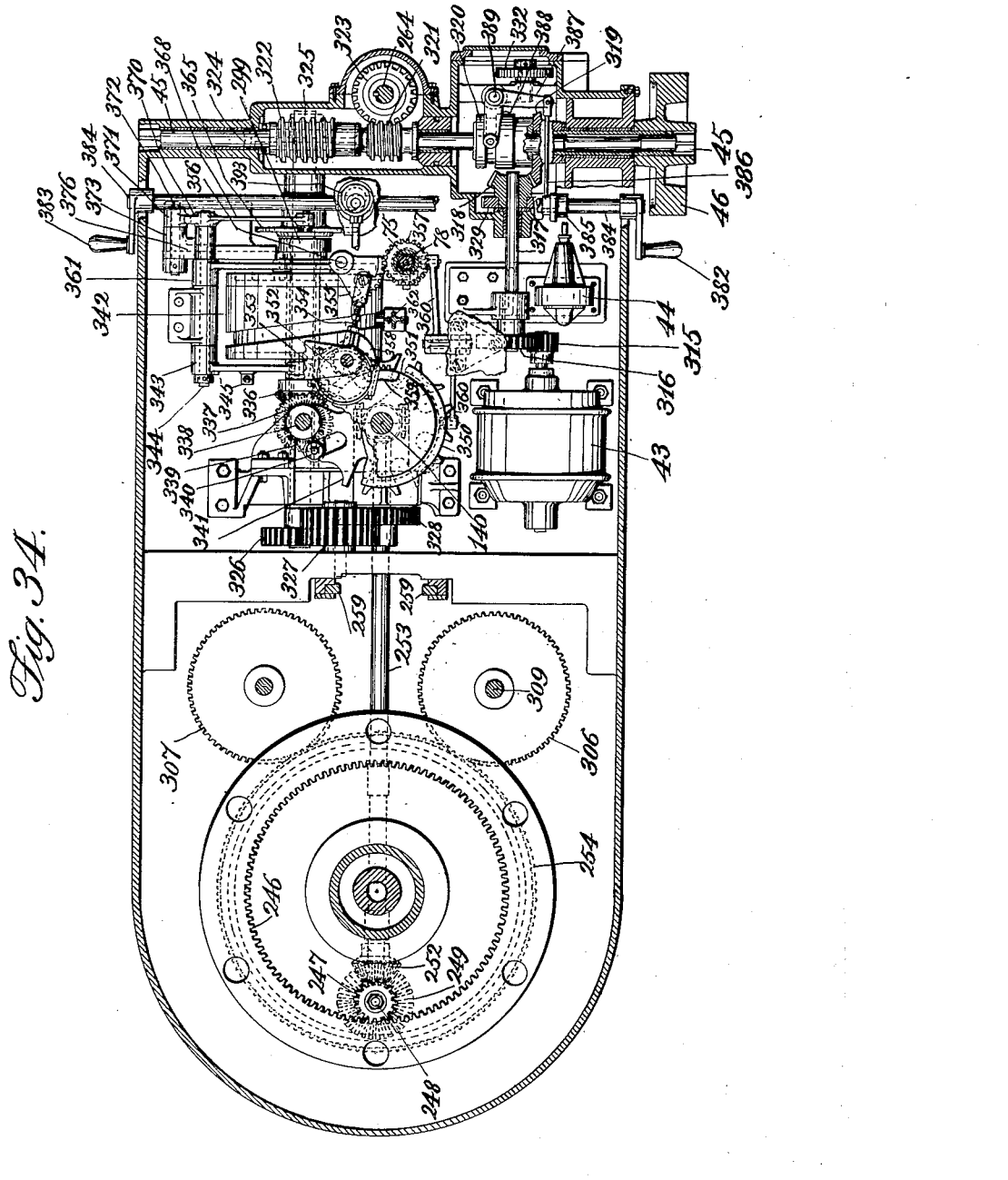

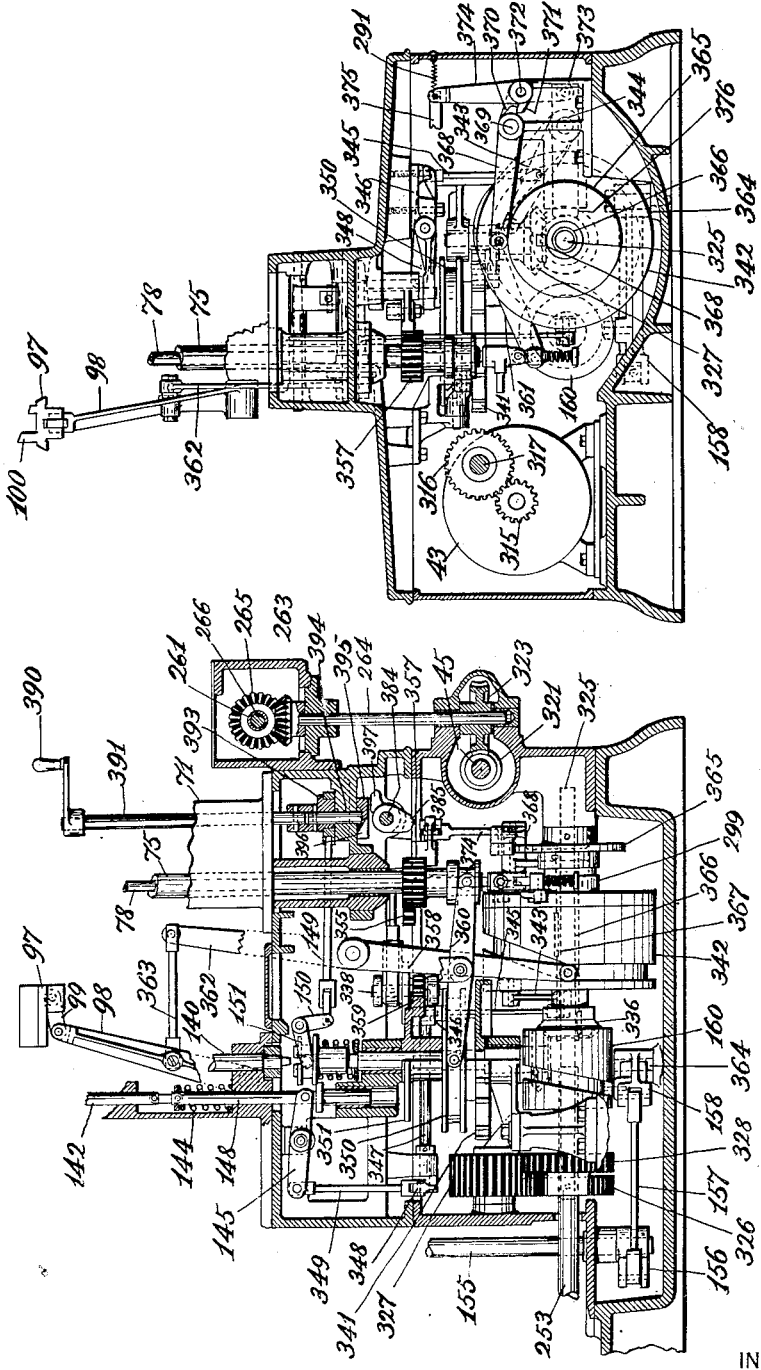

Patented May 15, 1934

1,958,769

UNITED STATES PATENT OFFICE 1,958,769

MACHINE FOR CRIMPING PLASTIC CAPS ON BOTTLES

Rupert E. Rundell, Rockville Center, N. Y., assignor to Lakewest Corporation, a corporation of New York Application April 7, 1926, Serial No. 100,398
Renewed August 6, 1932

77 Claims. (Cl. 226—83)

This invention relates to an improvement in machines for crimping plastic caps on bottles or similar containers.

A few machines for the purpose indicated are known but their output is small, about 6 per minute (as stated in one patent), the low output being due to the fact that a cap must be thoroughly heated before it can be crimped on the bottle, and the heating operation on one cap is completed before another cap is subjected to the heat. These machines have not gone into commercial use for the reason that their output is so small that their operation is uneconomical, especially where hundreds of thousands of milk bottles, for example, must be capped in a few hours each day. This trade demands, not the capping of 6 bottles per minute, but 50 per minute. This speed cannot be attained by thoroughly heating one cap before another is subjected to heat.

It has now been discovered that by progressively heating a plurality of plastic caps, progressively crimping a plurality of heated caps on bottles, and successively presenting caps to the heating means and to the crimping means, so that while any one cap is being heated, a number of others will be in progressive stages of the heating operation; and while one cap is being crimped on a bottle, a number of others will be at progressive stages of the crimping operation, the desired result can be achieved to great economic advantage. The main purpose of the present invention is the production of a machine capable of achieving this result. A further object is the improvement of certain mechanisms used in machines of this character in order to attain the necessary high speed. With these and other objects not specifically mentioned in view, the invention is embodied in certain combinations and constructions which will be hereinafter fully described and then specifically set forth in the claims hereunto appended.

Figure 30:
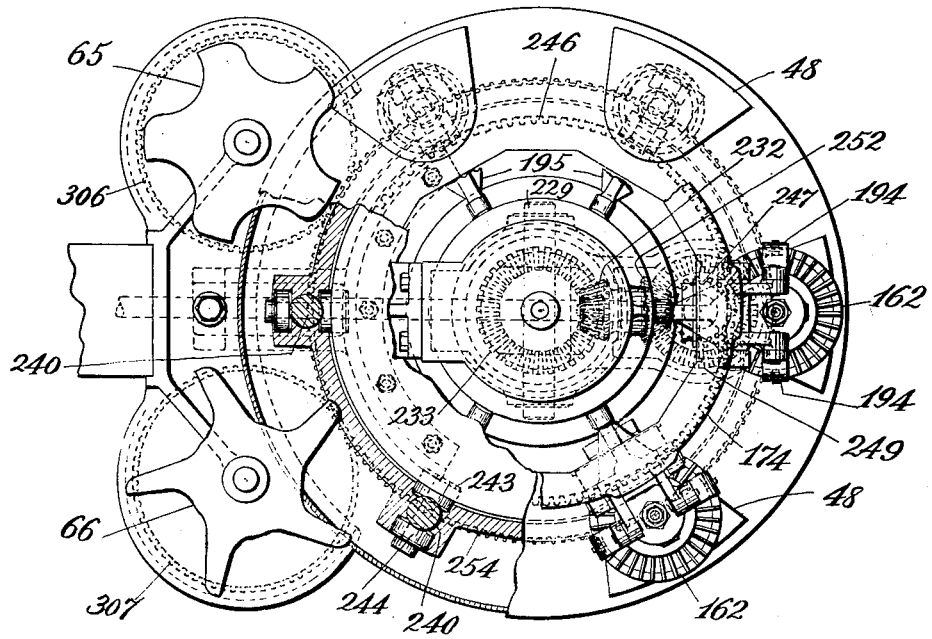
Figure 33:
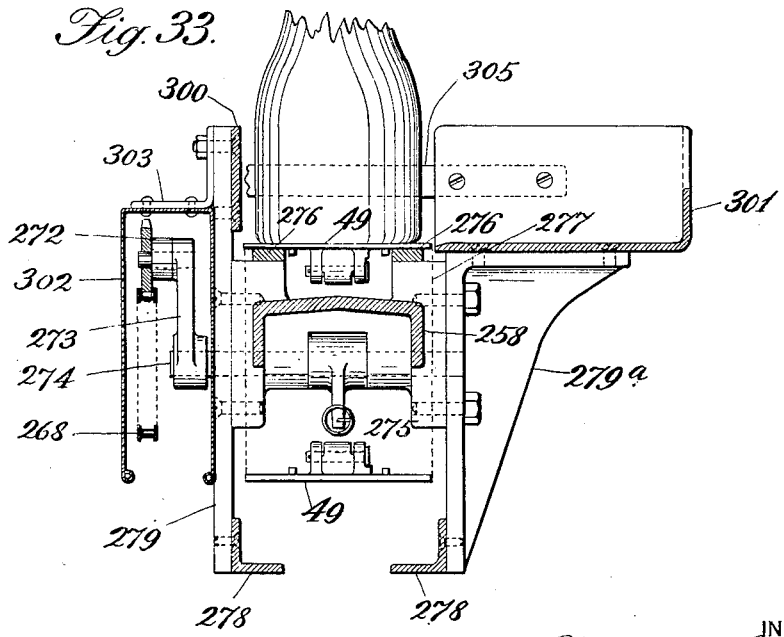

In the accompanying drawings, in which like characters of reference indicate the same or like parts, Fig. 1 is an elevation of the complete machine embodying the entire invention; Fig. 2 is a plan view of the machine shown in Fig. 1; Fig. 3 is an elevation of the cap magazine and stacker; Figs. 4 and 5 are plan views of the stacker in two positions; Figs. 6 and 7 are sectional elevations of the cap magazine discharge plunger; Fig. 8 is a plan view showing the manner of supporting the cap magazine; Fig. 9 is an elevation of the cap transferring suction arm; Fig. 10 is a top view of the cold-cap transfer; Fig. 11 is a front elevation of the cold-cap transfer; Fig. 12 is a side elevation of the cold-cap transfer and printer; Fig. 13 is a sectional elevation of the heater; Fig. 14 is an end elevation of the heater; Fig. 15 is a plan view of the hot-cap transfer; Fig. 16 is a side elevation of the hot-cap transfer; Fig. 17 is a plan view of the bridge upon which the hot-cap rests in its final position before being dropped into the crimping die; Fig. 18 is a sectional elevation of one of the crimping units; Fig. 19 is a plan view of one of the crimping dies; Fig. 20 is a sectional elevation of the bottle centering device associated with the crimping die; Fig. 21 is a sectional elevation of the cap centering device associated with the crimping die; Figs. 22 to 28 are sectional diagrams showing the various stages of the crimping operation; Fig. 29 is a sectional elevation of the turret including the crimping devices, the bottle plungers or elevators, and the raising and lowering device for adjusting the latter when bottles of different heights are to be capped; Fig. 30 is a plan view of the turret; Fig. 31 is a plan view of the bottle conveyors; Fig. 32 is a side elevation of the turret charging conveyor; Fig. 33 is a sectional end elevation of the turret discharging conveyor; Fig. 34 is a plan view of the drive and control mechanism; Fig. 35 is a side elevation of the drive and control mechanism; and Fig. 36 is an end elevation of the drive and control mechanism.

In carrying the invention into effect, there is provided means for progressively heating a plurality of plastic caps, means for progressively crimping a plurality of heated caps on bottles, and means whereby caps are successively presented to said heating means and said crimping means. In the best constructions contemplated, a larger number of caps are subjected to the action of the heat during the same time interval while a smaller number are undergoing the crimping operation, for the reason that it requires more time to heat the caps than it does to crimp the heated caps on the bottles. These means may be widely varied in construction within the scope of the claims for the specific structure selected to illustrate the invention is but one of many possible concrete embodiments of the same. The invention, therefore, is not to be restricted to the precise details of the structure shown and described.

Generally speaking, the machine shown comprises the following units: (1) the cap magazine and stacker; (2) the cold-cap transfer and printer; (3) the cap heater; (4) the hot-cap transfer; (5) the crimping turret; (6) the bottle conveyors; and (7) the drive and control mechanism.

These units are arranged on a common base having a crimping turret on one end, the cap magazine on the other, and the heater between the two. These three units are located along the longitudinal center line of the base, and the bottle conveyors are disposed on either side of them, the conveyor on one side presenting bottles to the crimping turret, and the conveyor on the other side taking the capped bottles away therefrom.

It may be here remarked that the caps used in this machine are made of paper treated with resinous material. They are pliable when heated, but when crimped over the neck of the bottles quickly become cold and rigid. As they go into the machine, they are in the form of flat disks.

Between the stacker and the heater, is located the cold-cap transfer which selects one cap at a time from the stacker by suction and conveys it to the heater by mechanical means, the cap on its way passing under a printer so that the date of bottling, etc. may be printed upon it. After one revolution of the heater, during which the cap has been brought to the proper temperature, the cap is pushed by a plunger onto the hot-cap transfer located between the heater and the crimping turret and which conveys the cap to one of the crimping devices on said turret. As the turret makes one revolution, a bottle is pushed up into cooperative relationship with the crimping device, which then closes down upon the bottle and seals the cap around the bead of the bottle neck.

Within the base is the drive including the driving motor, clutches, cams, gears, and control mechanism, and a vacuum pump for operating the suction head of the stacker unit. The machine shown, which is especially designed for capping milk bottles, is adjustable for bottles of different heights, as quart, pint, and half-pint bottles, and the conveyors are pivoted at the stacker end of the base, their ends nearest the crimping turret, as well as the bottle plungers or elevators, being adjustable in height in order to bring the tops of bottles of all sizes to the same crimping level, the heads and necks of bottles of all sizes being alike.

Referring to Figs. 1 and 2, the base 40 of the machine is made in the form of a rectangular box with one semi-circular and one square end, the semi-circular end and the sides thereof being provided with doors having hinges 41 and knobs 42, affording access to the interior of the base. Within this base are located the driving motor 43, the vacuum pump 44 and the various parts of the drive. At one end of the clutch shaft 45 is a flywheel 46.

On the semi-circular end of the base is mounted the crimping turret generally indicated by the reference character 47, the adjustable bottle plungers or elevators 48 receiving the filled but uncapped bottles from the charging conveyor 49 and delivering the capped bottles, after they have been pushed into the crimping devices 50 and provided with caps, to the discharging conveyor 51. On its outer side the top of the turret carries a squared-end shaft 52 which is the actuator of mechanism to be hereinafter described, by means of which the normal height of the bottle elevators 48 and of the conveyors 49 and 50 is adjusted in accordance with the height of the bottles to be capped. On its other side, the top of the turret is provided with a bracket 53 which supports the fulcrum arm 54 of the movable part 55 of the hot-cap transfer.

The heater 56 is in the form of a turret rotatable on a horizontal axis and disposed crosswise on the base, the cold-caps being introduced into its peripheral slots from one side of the turret by the cold-cap transfer 57, and the hot-caps after one revolution of the turret being pushed out at the opposite side of the same and taken by the hot-cap transfer 55 to the crimping devices 50. The heater is operated by steam which is conducted to it by the steam inlet pipe 58, and from it by the outlet pipe 59.

The stacker has two vertical cylindrical magazines 60, from which the caps are alternately taken by a swinging discharge plunger plate 61, which, on being pushed up, opens the cap-holding fingers 62 of the magazines and thereby releases a quantity of caps which drop onto the plunger plate, forming thereon two small stacks of caps, as it swings from one magazine to the other. From these stacks, one cap at a time is taken by the suction arm 63 and deposited on the cold-cap transfer 57 as the latter comes into position under the suction head at one end of its stroke. After a given number of caps have thus been taken from one stack, the plunger plate swings around, bringing the full stack under the suction head, and the depleted stack under its filling magazine.

While being transferred from the stacker toward the heater, the cap passes under the printing roll of the printer 64', and by the latter is dated.

The filled but uncapped bottles are placed by hand on the conveyor 49 by one operator, and the capped bottles are taken off the conveyor 51 by another operator. From the conveyor 49 the bottles are conveyed on the bottle elevators 48 by the cam operated arms 64 and the star wheel 65, and after they have been capped they are transferred from the bottle elevators to the conveyor 51 by the star wheel 66.

Stacker (Figs. 3 to 9)

The caps are manually placed in the two cylindrical magazines 60, in which they are held by the fingers 62, which are pivoted in the collar 67 and pressed against the sliding cam rings 68 by the spring 69, the rollers 70 carried by the fingers 62 resting against the chamfered end surfaces of the rings 68.

The magazines 60 are stationary, being supported from the base 71 of the stacker by the rod 72 which carries the split spectacle frame 73, between the two parts of which the magazines are clamped (Fig. 8). The outside ends of the circular parts of the frame 73 do not meet, but leave exposed a vertical slot 74 in each magazine through which access may be had to the caps stacked therein. Below the magazines is supported, on the hollow shaft 75 passing through the stacker base 71, the horizontally turnable and vertically slidable sector-shaped plunger-plate 61 which has the plunger-pins 76 arranged in two sets in such manner that at one end of its horizontal stroke the pins at one end fit between the fingers 62 of one magazine, and at the other end of the stroke the pins at the other end fit between the fingers of the other magazine, while in each end position the plunger ends not under a magazine are symmetrically arranged around the mouth of the suction head 63.

When the plunger plate 61 is in one of its extreme positions under one of the magazines 60 and is pushed upwardly, the pins 76 at one end will pass between the fingers 62 and raise the cam ring 68, thereby forcing the rollers 70 outward, opening the fingers and allowing a quantity of caps to drop upon the plunger plate 61 between said set of pins 76. Upon lowering the plunger plate, the cam ring 68 returns with it, until, in its original position, the rollers 70 have been forced back by the spring 69, and the fingers 62 have closed.

When the plunger plate 61 is now swung into its other extreme position, the caps received from the magazine by the first operation are beneath the suction head 63. The latter is supported by the stationary arm 77 which is clamped to the magazine supporting rod 72 and carries the suction tube 78, the clamp 79 securing the joint between the tube 78 and the suction head 63 and carrying the suction valve 80. The tube 78 is slidably supported in the hollow shaft 75 and is moved up and down once with every step of the machine. When the suction head is coming down, the suction valve 80 which has been closed by the engagement of its nose 81 with the nose 82 of the pivoted stop 83 on its downward stroke, is opened by the engagement of its other nose 84 with the stop 85 fastened to the vertical lever 86 pivoted on the stationary supporting arm 77 shortly before the suction head touches the top cap of the stack. The suction arm thus will pick up the top cap and raise it on its upward motion, so that the receiving plate of the cold-cap transfer can slide under it. It may be here remarked that the caps are made of crepe paper, are rough surfaced, and do not fit the suction arm with an air-tight fit; consequently, when the suction is on they are held, but when it is off they drop. Upon its upward movement, the nose 81 of the suction valve, on striking the stop 82, swings the latter around its pivot against the pressure of the spring 87, the valve remaining in the open position against the stop 88. After the cap transfer plate has passed into its extreme position under the incoming cap, the suction head moves downwardly, its valve being closed by the engagement of the nose 81 with the pivoted stop 83 which is fastened by the plate 89 to the stationary arm 77, and is held in its horizontal position by the stop-pin 90 against which it is pressed by the spring 87. The suction thus being cut off, the cap drops onto the transfer plate, which immediately moves forward, clearing the way for the further upward movement of the suction head on its way to pick up and raise the next cap. In the meantime, the plunger plate 61 remains stationary until a number of caps have been transferred by the repeated operation of the suction head. It then swings back to the first magazine, thus bringing the charge from the second magazine into the transfer position, as shown by the arrows in Figs. 4 and 5. The lever 86 is held in its vertical position by the spring 91 which pulls it against the trip-piece 92. When it is desired to shut off the suction from the head 63, as when using up the caps in a machine after a day's run, it is only necessary to trip the piece 92 by pressing against its handle 93, whereupon the spring 91 will pull the lever 86 against the stop 94, and thus will move the lower stop 85 which opens the suction valve on its upward stroke out of the way, so that the opening nose 84 of the valve cannot engage it in coming into its lower position. The machine will then operate without feeding more caps into the heater.

*Cold-cap transfer and printer (Figs. 10 to 12)*

Upon the bracket 95, which is fastened to the base of the heater, are mounted guides 96, between which the slide 97 is moved back and forth by the cam-operated lever 98, connected with it by means of the link 99. To the unequal upward projections 100 of the slide 97 are fastened, at equal distance from each other's cap engaging points, the cap plunger plates 101 and 102 and the plunger buttons 103, the first plunger plate 101 being attached to the slide 97, on a level with the inclined stationary table 104, affixed to the bracket 95, the second plunger plate 102 being mounted upon the first plunger plate 101, and the plunger buttons 103 upon the second plunger plate 102.

A cap 105, dropped by the stacker suction head onto the transfer at the end of its back stroke, is deposited upon the top plunger plate 102 whence, upon the forward stroke of the transfer slide, it is pushed by the plunger buttons 103 onto the lower plunger plate 101, being kept from sliding off the oblique plane by the angle support 106 located near the bottom of the incline which is on the upper side of Fig. 10. The cap thus deposited upon the lower plunger plate in position 107 is prevented from moving back with the slide on its rearward stroke by the strippers 108 secured to the supports 109, attached to the stationary table 104, the strippers 108 being pivoted on the supports 109 to allow the caps to enter below them on their forward movement. Cap 107, on the next forward stroke of the transfer slide 97, is pushed by the plunger plate 102 into the position 110 on the table 104, from which, on the next stroke, it is pushed into the heater by the plunger plate 101. On its way from the position 107 to the heater, the cap is kept in position by the guards 111 and 112, attached to the forward sides of the brackets 109 and 113 respectively, and, after having reached position 110, it is prevented from sliding back with the transfer by the strippers 114 pivoted to the bracket 113. On the lower forward end of the table 104, the angle bracket 115 is provided in order to support the caps. While moving from position 105 to position 107, the cap passes under the printer 64 so that it may be marked with the day of week, or date, before entering the heater, the name of the bottler, bottling station, etc. having previously been printed on the cap in a different color.

The caps are fed into the heater at slot position 116, just above the horizontal plane including the heater center, and they remain in the heater for one slot division less than a complete revolution, being discharged at slot position 117, just below said plane. When the cap has arrived at position 117, the plunger 118, which is fastened to the slide 97 of the cold-cap transfer and is guided by the rollers 119, attached to bracket 95, pushes the cap out of the heater slot onto the hot-cap transfer, located on the far side of the heater. In Fig. 10, the cap is shown in all five positions from the stacker to the crimping device, namely, in its three positions 105, 107 and 110, in the cold-cap transfer, in position 116 in the heater slot, in position 120 in the hot-cap transfer, into which it is placed by the plunger 118, and in its final position 121 on the crimper die.

*Heater (Figs. 13 and 14)*

The heater includes a rotatable hollow turret 122, provided with suitable slots 122', to receive the caps to be heated, and it further includes the frame 123 upon which the turret is mounted and which contains the steam chambers and the bearings for the transmission gears and motion stopping device.

The turret 122, which is made with many equidistant peripheral slots 122' for receiving the caps, is provided with a hollow hub 125, with an internal bearing on the hub of the end casting 126, and has further the shaft extension 127 with external bearing in the heater base 123.

Near the center of each slot, both sides of the turret 122 carry spring actuated guards 128 which prevent the caps from sliding or rolling out of the sides of the slots while being heated. In the charging and discharging position of each slot, the guards 128 at both positions 116 and 117 are held open while the transfer of the caps takes place, by the engagement of the respective guards with suitably projecting pins 129 carried by the transfers. Just before the heater comes to rest at each step, the rotation of the turret being intermittent or step-by-step, these pins 129 engage the guards 128 and hold them so that the slots are clear after the heater has stopped, and when the heater resumes its motion, the guards pull away from the retaining pins, and the springs on the guards again close up the slots.

The peripheral ends of the heater slots are covered by a cylindrical sleeve 130 supported by end rings 131, the sleeve 130 having axial slots 132 which normally are set between the slot openings of the turret, but which may be brought into register with the turret slots to permit removal of caps from the heater or for cleaning out the heater slots.

To keep the heater dry during the operation of the machine, any condensation water forming in the steam chambers is immediately carried off by the rotation of the drum. One of the slots 122' terminates at a scoop 133 partly surrounding the central portion of the turret at a diameter somewhat smaller than the hollow hub 125. When in its lowermost position, the peripheral portion of this scoop catches the water in the turret and delivers it to the hollow hub 125 when rising above the center line.

The end-casting 126 has the steam-inlet port 134 and the steam-outlet port 135 and carries the central inlet pipe 136. The hub 137 of the end-casting 126 forms around the central shaft 136 an annular space the rear end of which is closed by the division wall between the steam ports 134 and 135, and the front end of which communicates with the chamber in the hollow hub 125 of the turret. Steam enters by way of the pipe 58, passes through the port 134 and the pipe 136 into the turret and returns through the hollow hub 125 and concentric end-casting hub or pipe 137 to the port 135, whence it is carried off by exhaust pipe 59. A stuffing-box 138 is interposed between the end of the turret hub 125 and the hub of the end-casting 136 to prevent leakage of steam through the heater journal.

The heater is driven by the bevel-gear 139 mounted on the vertical shaft 140 supported in base 123 and meshing with bevel gear 141 mounted on the turret hub 125, the intermittent motion of the drum being obtained by means of the cam-operated lock-pin 142 engaging with holes 143 provided in the circumference of bevel-gear 141, the spring 144 serving to hold the lock-pin in place until disengaged by the lever 145. The shaft 140 has the clutch 146, a collar of which rests on the collar 147 affixed to lock-pin shaft 148. When it is desired to stop the heater, for cleaning or other purposes, the clutch 146 is disengaged by means of the rod 149, crank 150 and shift-lever 151, thereby depressing the lock-pin collar 147 and thus also disengaging the lock-pin 142. Operation of the rod 149 is controlled by a special locking device to be described later, so that the main clutch of the machine cannot be thrown in while clutch 146 is disengaged.

*Hot-cap transfer (Figs. 15 to 17)*

The cap ejected from the heater 56 by the plunger 118 drops onto the swinging plate 152 which is suspended by the swivel arm 55 from the fulcrum arm 54 carried by the bracket 53 above the crimping turret 47. The arm 55 is actuated by the rod 153 attached to the lever 154 fixed to the vertical shaft 155 held by the turret-bracket 53, the shaft 155 being swung back and forth by an arm 156 operated by the rod 157 attached to a cam-lever 158 engaging by a roller 159 with the cam 160. When in its forward position, the plate 152 delivers the cap onto the stationary bridge 161 projecting into the turret space just above the rotating crimper dies 162, the cap being held in place, as the plate recedes, by the stripper 163 operated by the lever 164 from the rod 165 attached by the arm 166 to the shaft 167. The shaft 167 also carries an arm 168 which operates the stripper 169 located near the heater delivery slot. The shaft 167 is actuated by an arm 170 connected by a rod 171 with the cam-lever 172 engaging by roller 173 with cam 174 on the crimper turret. The cam-lever 172 is pivoted on the turret-arm 53 and held in engagement with the open cam 174 by the spring 175. The bridge-piece 161, which is shown separately in Fig. 17, is attached by the bar 176 to the plate 177 fastened to the heater-base 123.

*Crimper (Figs. 18 to 28)*

The crimper units consist of the shell 178, attached by bolts 179 to the rotating sleeve 180 of the turret, which carries the crimping devices 181, and of the crimping die and cap support 162 attached to the arm 182 which is controlled by the cam 183 through roller 184.

The shell 178 has the bushing 185 and carries the plunger 186 having the spherically mounted head 187 which fits onto the top of the bottle. The fingers 181 are pivoted in the ring 188 attached to the bushing 185, being held in place by the retaining ring 189. The fingers pass through spacing slots in the finger guide ring 190, and at their lower ends have rollers 191 which are pressed by the continuous coil spring 192, surrounding all the fingers, against the head 187. They are opened by raising the ring 193 suspended by links 194 from the lever 195 fulcrumed in bracket 196 and actuated by the cam 197, in the track of which its inner end is held by the spherical ball bearing 198. The fulcrum 196 is adjustable in height by means of the set screw 199, so that the position of the finger-opening ring 193 can be regulated to suit different conditions. The shell 178 has the cover 200 with the adjustable stop-screw 201 which limits the stroke of the plunger against the spring 202. The spring 203, inserted between the holding-piece 204 attached to the rotating turret-shell 180 and the lug 205 projecting from the die-arm 182, pushes the roller 184 of the die-arm 182 against the top of the cam track 183, thereby supplying the pressure for holding the cap to the crimper-head, the track of the cam 183 being made wider than the rollers 184 to allow for variation in the thickness of the caps.

As the bottle is pushed up through the die, it picks up the cap deposited thereon by the transfer and pushes it up against the head 187 of the plunger 186. The latter then is raised against the spring 202 until stopped by the screw 201, the rollers 191 of the fingers 181 in the meantime pressing the cap around the neck of the bottle, after which the fingers are opened by the upward motion of the ring 193 and the sealed bottle descends, the successive steps of the crimping operation being shown in Figs. 22 to 28.

As the bottle-neck passes up through the die, it is placed in the exact central position by means of the centering fingers 206 which are spread apart by the entering bottle, being held in their innermost position by the spring 207 attached to the cam-lever 208. The fingers 206 have rollers 209 fitting into radial slots 210 of the die 162 and are provided with curved arms 211, concentric with the die and hinged to a concentric ring 212 at points a little more than a right angle away from the respective fingers, so that a limited turning of the ring 212 produces a motion of the pivots practically parallel to the radial slots 210. The pressure of the bottle-neck against one or more of the fingers 206 causes the centering ring 212 to turn in the direction of the pressure and, since all fingers are pivoted to the ring, they will all move simultaneously in the slots 210, thus holding the bottle centrally in the die. The cam-lever 208 is fast on the shaft 213 to which is affixed the rocker-arm 214 engaging with the roller 215 carried by a lug on the centering ring 212. When the sealed bottle is ready to descend, the cam 216, by means of the roller 217, depresses the lever 208, thereby actuating the rocker-arm 214 and turning the centering-ring 212 in such direction and to such amount as to open the centering fingers wide, thus allowing the capped bottle-neck to freely pass through the die.

The cap is placed and centered on the die by means of two projecting fingers 218 (Fig. 21) pivoted in radial slots of the die, these fingers entering and passing along the curved slots of the stationary bridge 161 as the die passes below it, stripping the cap from the bridge and dropping it into the central recess of the die. As the die subsequently comes up in contact with the crimper fingers 181, the projecting portion of fingers 218 are pushed down into the slots against the springs 219 which again raise the fingers as soon as the die starts on its downward stroke.

*Crimping turret (Figs. 29 and 30)*

The stationary central column 220 of the crimping turret carries the ring 221 to which are attached the cams 183 and 197, the latter supporting the top-cover 222. On the collar 223 of the central column 220 is supported the revoluble shell 180 to which the crimper units 50 are attached. The shell 180 has the horizontal ball bearing 224.

Between the column 220 and the shell 180 is slidably mounted the revoluble cage 225 which has the plungers or elevators 48 which receive the open bottles from the charging conveyor, lift them up into the crimpers and deliver them to the discharging conveyor. Relative turning motion between the shell 180 and the cage 225 is prevented by the key 226 fastened to the shell 180 and slidable in the long keyway 227 of the cage. The cage 225 rests on the stationary cam 228 surrounding the revoluble shell 180.

Cam 228 is connected by the cross-pin 229 with the sleeve 230 of the screw-shaft 231 which can be turned by bevel-gears 232 and 233 by means of a crank applied to the end of shaft 52 carried by the turret-cover 222. The cross-pin 229 has the collars 234 fitted within the bore of the cam 228 at each side of sleeve 230. By turning the shaft 52, the cam 228, upon which rotates the cage 225 with the plungers 48, may be raised or lowered to adjust the machine for bottles of different heights. The shell 180 is provided with the vertical slot 235 and the horizontal lugs 236 connected by the bolt 237, so that the shell 180 can be clamped tight on cage 225 after each adjustment for bottle size, as indicated by the pointer of the eye-piece 238 of shell 180 on the scale 239 attached to cage 225, has been made.

The plungers 48 are mounted on the rods 240, their heads being made resilient by the springs 241 inserted between the plunger guide 242 and the plunger 48, the springs 241 being made stronger than the springs 202 in the crimper-shells 182, so that the latter spring compresses first, allowing the bottle to pass through the die into contact with the crimper-head, the plunger-spring 241 acting only after the bottle is up to the crimper, thus taking up variations in the height of the bottles, without danger of bottle breakage and loss of milk.

During their rotation, the plungers are actuated vertically by the stationary cam 228, in the track of which run the rollers 243 attached to the rods 240 of the plungers, the guide rollers 244 mounted on the same shafts on the opposite sides of the rods 240 between the vertical guides 245 preventing the plungers from turning.

The plungers are rotated by the internal gear 246 mounted within the cage 225 and driven by the pinion 247 on the shaft 248 supported by the stationary cam 228 and driven by the bevel-gear 249 mounted on the spline-shaft 250 which is connected with the pinion-shaft 248 by the universal joint 251, the latter taking care of inaccuracies of alignment as the spline-shaft 250 is raised or lowered to follow the plunger-cage when adjusting for bottles of different heights. The bevel-gear 249 is driven by the bevel-gear 252 on the horizontal shaft 253 journaled in the central column 220 of the turret. The gear 254, attached to the bottom of the plunger-cage 225, drives the star-wheels 65 and 66 of the bottle conveyors.

To the cam 228 is attached the support 255 which carries the bracket 256 to which is attached the slide 257 (Fig. 32) for adjusting the height of the bottle conveyors; the adjustment of the bottle plungers from shaft 52 thus automatically also adjusts the conveyors, so that only one adjustment is necessary when changing the machine to accommodate bottles of different heights.

*Bottle conveyors (Figs. 31 to 33)*

The bottles are taken to and from the plungers 48 of the turret by two endless chains 49 and 51 supported by arms 258 pivoted at the outer end of the conveyor and supported at the turret end by a slide 257 movable in the guides 259 attached to the base 40 of the machine, the slide 257 being actuated by the raising and lowering device described in connection with the turret.

The sprocket 260 of the discharging conveyor 51 is driven directly from the shaft 261 by the bevel-gear 262 meshing with the bevel-gear 263 on the vertical drive-shaft 264. The charging conveyor 49 is driven by the bevel-gear 265 meshing with the main-gear 263 and mounted on the sleeve 266 surrounding the shaft 261, the sleeve 266 having the sprocket 267 which, by means of chain 268 and sprocket 269, drives the shaft 270 at the turret-end of the conveyor. Idlers 272, attached to arms 273 on shafts 274, are caused by springs 275 to bear against the chain 268.

The conveyor chain links, when in their carrying position on top of the sprockets, rest upon guides 276 attached to the lugs 277 on angles 278. In their returning position, they are guided by angles 278 upon which they will ultimately rest after the chains have been stretched by wear. The angles 278 are supported by brackets 279 and 279ª attached to the pivot-arms 258.

The charging conveyor 49 has side guards 280, supported by rods 281 which are adjustable by means of pivoted bars 282 set by the thumb screws 283 to suit the diameter of the bottle to be capped. The bottles are taken off the conveyor 49 by the star-wheel 65 which places them upon the plungers 48 of the turret, the lever 284, fulcrumed on the adjustable bracket 285 and actuated through a spring-tensioned roller-crank by cam 286, spacing the bottles and guiding them into the grooves of the star-wheel, thus preventing the bottles from jamming at the turning point. Attached to the end of the inner side guard 280 are the rollers 287 and the curved guard 288 which guide the bottles into and around the star-wheel 65.

If one of the grooves of the star-wheel 65 should, for any reason, be empty during the continuous operation of the machine, it is important that no cap should be in the crimping unit which corresponds with the plunger on which no bottle has been deposited, as otherwise that crimper would have two caps on its die the next time it comes into operation, and would thus be liable to damage. To prevent this, the cam-operated shoe 289 supported in the guides 290 is provided, which bears against the bottle as it enters the star-wheel 65, being at that time free to move; and in this position of the shoe 289, the cap-transfer and heater operate normally. If, however, there is no bottle, the shoe 289 is moved forward into the empty bottle space by the spring 291 attached to the rod 292 which turns the arm 293 on the fulcrum-shaft 294 and by the arm 295 pushes the rod 296 attached to the shoe 289, the rod 292, by the crank 297, also turning the shaft 298, thereby disengaging the clutch 299 (Figs. 34 and 35) and stopping the stacker-suction, the cold-cap transfer, and the heater until the shoe is again pressed outward by the next bottle.

The discharging conveyor 51 has the guard 300 carried by the brackets 279, the shelf 301 attached to the brackets 279ª, and the chain guard 302 supported by angles 303 attached to the brackets 279. The discharging star-wheel 66 has the curved outside guard 304 and the inclined inside guard 305.

The star-wheels 65 and 66 are driven by the gears 306 and 307 respectively, both being in mesh with gear 254 of the turret. The star-wheels are supported by the cross-piece 308 attached to the conveyor slide 257, and the shafts 309 of the gears 306 and 307 are journaled in and collared to extensions of the turret bracket 256.

Between the star-wheels 65 and 66 is mounted, on bearings 310, a rod 311 from which is suspended a sheet 312 of resilient material such as leather or rubber, the lower edge of which rests on the top-plates of the plungers 48 as they pass below it, thus wiping them clean of milk spillage etc., before each new bottle is deposited thereon. The rod 311 has a screw manipulated adjusting arm 313 and a coil-spring 314, one end of which is attached to the rod 311 and the other end to one of the rod bearings 310, so that the wiper can be set to the proper angle for best results.

*Drive and control mechanism (Figs. 34 to 36)*

The driving motor 43 is geared by means of the pinion 315 and the spur-gear 316 to the shaft 317 which has the bevel-gear 318 meshing with the gear 319 on the main clutch shaft 45, having the flywheel 46, the main clutch 320, and the worms 321 and 322.

The worm 321 meshes with the horizontal worm-wheel 323 mounted on the vertical shaft 264 of the bottle conveyors, and thus connects with the main bevel-gear 263 of the conveyor drive.

The worm 322 meshes with the vertical worm-wheel 324 on the end of the shaft 325 which has the spur gear 326 at its other end. The spur gear 326 meshes with the intermediate gear 327, and the latter in turn meshes with the gear 328 on the horizontal turret-shaft 253 having the bevel-gear 252 which drives the gear 249 on the vertical spline shaft 250 (Fig. 29), and finally, through the pinion 247 on the shaft 248, which is coupled with the shaft 250 by the union 251, drives the turret internal gear 246 and the external gear 254 mounted on the turret-cage. The gear 254 is in mesh with the gears 306 and 307, driving the conveyor star-wheels 65 and 66, respectively.

The gear 329 on the shaft 317, meshing with the gear 330 (Fig. 1), drives the intermediate shaft 331 having the gear 332 which meshes with the gear 333 on the pump coupling shaft 334 which, through the coupling 335, drives the suction pump 44.

About the shaft 325 is mounted the bevel-gear 336 which meshes with the gear 337 on the vertical shaft 338 having the crank 339 engaging, by the roller 340, with the Geneva gear 341 which is mounted on the heater drive shaft 140 and gives to that shaft its intermittent motion.

The heater lock-pin 142 is actuated by the left-end-track of the cam 342 mounted about the shaft 325, this track controlling the lever 343 fulcrumed on the shaft 344 and thereby moving the vertical rod 345 up and down. The rod 345, by means of the crank 346 (Fig. 35) rocks the horizontal shaft 347 which in turn, through crank 348 and vertical rod 349, operates the lever 145 attached to the lock-pin shaft 148, shown in Fig. 13.

The heater shaft 140, above the Geneva gear 341, carries the cam 350 and the gear segment disc 351. The teeth of the disc 351, when engaging the gear 352, turn the eccentric 353 which is connected by the rod 354 with the gear-sector 355 mounted on the shaft 356, giving to the latter an oscillating motion. The gear-sector 355 meshes with the gear 357 on the vertical hollow stacker-shaft 75 which, on its upper end, carries the stacker plunger-plate 61, the latter thus being moved back or forth at each engagement of the segment disc 351. To prevent jamming of the teeth by accidental angular displacement of the gear 352 when out of engagement, the latter is provided with a lock guide 358 accurately fitted to the circumference of the segment disc so that the gear 352 cannot turn while the lock guide is engaged. At the working point of the segment, the guide surface has a portion of its circumference cut away to form a recess 359 allowing the lock guide 358 to turn with the gear 352 when the teeth are in engagement.

The cam 350, by means of the horizontal lever 360, gives an up-and-down motion to the hollow shaft 75 of the stacker plunger-plate 61, while the right end-track of the cam 342, mounted on the shaft 325, actuates the lever 361 fulcrumed on the shaft 344 and connected to the suction pipe 78 passing through the plunger-plate shaft 75, thereby raising and lowering the suction head 63 of the stacker.

The circumferential track of the cam 342 actuates the vertical cam lever 362 connected by the rod 363 to the slide lever 98 (Fig. 11), thereby reciprocating the slide 97 of the cold-cap transfer. The slide 97 is provided with a rack for operating the printer during its forward stroke, turning of the printing-roll during the back-stroke of the rack being prevented by a ratchet placed on the gear-shaft of the printer.

The cam 160 (Fig. 35), at the end of the turret drive-shaft 253, by means of the roller 159, actuates the cam lever 158 supported on the fulcrum 364 in the base of the machine, and connected by the rod 157 to the arm 156 on the vertical shaft 155 which operates the hot-cap transfer.

The skip-cap device referred to in connection with the turret charging bottle conveyor is operated by the cam 365 mounted on the shaft 325 which on the loose sleeve 366 has the clutch 299 locked to the cam 365 by the slide key 367. On the sleeve 366 are mounted the heater drive gear 336 and the cam 342 actuating the heater lockpin, the cold-cap transfer slide, and the stacker suction-head lift. The cam 365 engages the cam-lever 368, which is fulcrumed on the shaft 369 having beyond its fulcrum a shoe extension 370 engaging a similar shoe 371 on the shaft 372 supported by the bracket 373. On the shaft 372 is fulcrumed the lever 374 pivoted on its upper end to the link 375 connecting it with the rod 292 (Fig. 31), and on its lower end to the clutch unlocking bar 376 slidably carried in the bracket 373. When the star-wheel 65 of the charging conveyor has a bottle in every compartment, the skip-cap shoe 289, which is released by the cam 365 during a portion of the passage of each bottle, bears against the passing bottle, thereby pushing the rod 296 and pulling the rod 292 with the link 375, thus pulling the upper end of the lever 374 and holding bar 376 clear of the lock-key 367. Now, when one of the bottle spaces in the star-wheel 65 is empty, the spring 291 attached to the rod 292 pushes the shoe 289 into the bottle space at the time of cam releasement, thereby pushing out the lever 374 and bringing the bar 376 into engagement with the lock key 367. When the bar 376 approaches the clutch 299, its wedge-shaped end enters an oblique slot in the key 368 and slides the latter out of engagement with the cam 365, thereby unlocking the sleeve 366 from the shaft 325, thus stopping the transfer-actuating cam 342 and the heater drive gear 336. As the cam 365 then raises the lever 368, the engagement of the shoes 370 and 371 turns the lever 374 and pulls the rod 376 out of engagement with the lock key 368, which then is pushed back into locking position by a spring, thus again setting the cam 342 and gear 336 into motion. To prevent the heater from coming out of step with the transfer slide while disengaged, the unlocking-bar-contact-surface of the clutch 299 is made with an axial shoulder which engages with the side edge of the bar 376 immediately after the lock key is withdrawn and thus locks the sleeve 366 to the unlocking bar while the latter is in engagement with the lock key.

In order to operate the heater and cap feeding device so as to fill up the heater before bottles are fed into the turret, the handle 377 on the shaft 378 mounted in the stacker-base 71, which normally is held in place by the spring 279, is turned, thereby causing the lever 380 (Fig. 31) to engage with the pin 381 in the rod 292 and pulling the unlocking rod 376 out of engagement, thus locking the sleeve 366.

The handles 382 and 383 on either end of the hand-control-shaft 384 serve to manipulate the main clutch 320 by means of the crank 385 on the shaft 384, of the connecting rod 386, and of the lever 387 and clutch shift-arm 388 on the fulcrum shaft 389. However, to avoid trouble in starting the machine when the heater drive is disconnected, provision is made that the clutch 320 cannot be thrown when the heater clutch 146 is out of engagement. The heater clutch is manipulated by the handle 390 on the shaft 391 engaging by the pin 392 a slot in the hub of the eccentric 393 which, by the rod 149 and lever 150, operates the shift-arm 151. At its lower end, the shaft 394 of the eccentric carries a disc 395 having a radial slot 396. The hand control shaft 384 has an arm 397 which will hit the disc 395 when trying to turn one of the handles 382 or 383, unless the handle 390 is turned so that the slot 396 in the disc 395 registers with the arm 397, when the latter will enter the slot, thus allowing the shaft 384 to be turned. The disc 396 is so set on the shaft 394 that the slot-engaging position of the handle 390 corresponds to the operating position of the clutch 146, so that the latter is set in engagement by the act of unlocking the handles 382 and 383 for starting the machine.

What is claimed is:

1. The combination with means for progressively heating a plurality of plastic caps, of means for progressively crimping a plurality of heated caps on bottles, and means whereby caps are successively presented to said heating means and said crimping means, said heating means including a turret having a series of peripheral slots for supporting a plurality of caps, turret heating means, turret rotating means, and a cylindrical sleeve on the periphery and guards on the sides of said turret for retaining caps in said slots during turret rotation.

2. The combination with means for progressively heating a plurality of plastic caps, of means for progressively crimping a plurality of heated caps on bottles, and means whereby caps are successively presented to said heating means and said crimping means, said heating means including a turret having a series of peripheral slots for supporting a plurality of caps, turret heating means, turret rotating means, and a cylindrical sleeve movable on the periphery and guards on the sides of said turret for retaining caps in said slots during turret rotation, the sleeve having slots which may be brought into register with the turret slots to permit removal of caps from the latter.

3. The combination with means for progressively heating a plurality of plastic caps, of means for progressively crimping a plurality of heated caps on bottles, and means whereby caps are successively presented to said heating means and said crimping means, said heating means including a hollow turret for supporting a plurality of caps and having a hollow hub, concentric pipes projecting into said hub for conducting steam to and from the interior of said turret, and means for rotating said turret.

4. The combination with means for progressively heating a plurality of plastic caps, of means for progressively crimping a plurality of heated caps on bottles, and means whereby caps are successively presented to said heating means and said crimping means, said crimping means including a turret, series of bottle supports and crimping devices carried by said turret, said crimping devices each having a crimping head provided with a series of crimping fingers pivoted thereto and having projecting prongs, means for normally pressing said fingers toward a common center, a ring surrounding said fingers and adapted to engage said prongs to spread said fingers apart when a cap has been crimped on a bottle, means for rotating said turret, and means for actuating said support and fingers during turret rotation.

5. The combination with means for progressively heating a plurality of plastic caps, of means for progressively crimping a plurality of heated caps on bottles, and means whereby caps are successively presented to said heating means and said crimping means, said crimping means including a series of bottle supports normally spring-pressed upwardly, and a series of crimping devices each having a crimping head provided with a series of crimping fingers and normally spring-pressed downwardly, the yielding force exerted by the bottle supports being greater than that exerted by the crimping head but insufficient to cause bottle breakage.

6. The combination with means for progressively heating a plurality of plastic caps, of means for progressively crimping a plurality of heated caps on bottles, and means whereby caps are successively presented to said heating means and said crimping means, said presenting means including a two-part cap magazine from the parts of which caps are alternately drawn to be presented to said heating means.

7. The combination with means for progressively heating a plurality of plastic caps, of means for progressively crimping a plurality of heated caps on bottles, and means whereby caps are successively presented to said heating means and said crimping means, said presenting means including a cap magazine, and a stacking device receiving caps from said magazine and from which they are drawn to be presented to said heating means.

8. The combination with means for progressively heating a plurality of plastic caps, of means for progressively crimping a plurality of heated caps on bottles, and means whereby caps are successively presented to said heating means and said crimping means, said presenting means including a cold-cap transfer delivering caps successively to said heating means.

9. The combination with means for progressively heating a plurality of plastic caps, of means for progressively crimping a plurality of heated caps on bottles, and means whereby caps are successively presented to said heating means and said crimping means, said presenting means including means for separating caps from a stack, and a cold-cap transfer receiving caps from said separating means and delivering them successively to said heating means.

10. The combination with means for progressively heating a plurality of plastic caps, of means for progressively crimping a plurality of heated caps on bottles, and means whereby caps are successively presented to said heating means and said crimping means, said presenting means including a cap magazine, a stacking device receiving caps from said magazine, a suction device taking caps from said stacking device, a cold-cap transfer receiving caps from said suction device and delivering them successively to said heating means, and means for printing the caps while in said transfer.

11. The combination with means for progressively heating a plurality of plastic caps, of means for progressively crimping a plurality of heated caps on bottles, and means whereby caps are successively presented to said heating means and said crimping means, said presenting means including an open-bottomed twin cylinder magazine for caps, groups of retaining fingers at the bottoms of said cylinders, a stacking device movable upwardly to release said fingers and laterally to alternately receive stacks of caps from said cylinders, and means for transferring caps from said stacking device to said heating means.

12. The combination with means for progressively heating a plurality of plastic caps, of means for progressively crimping a plurality of heated caps on bottles, and means whereby caps are successively presented to said heating means and said crimping means, said presenting means including reciprocating means having two plungers one of which pushes a cold-cap into said heating means and the other pushes a hot-cap out of said heating means.

13. The combination with means for progressively heating a plurality of plastic caps, of means for progressively crimping a plurality of heated caps on bottles, and means whereby caps are successively presented to said heating means and said crimping means, said presenting means including, a swinging plate receiving hot-caps from said heating means and delivering them to said crimping means, and stripping means for preventing rearward movement of the caps during the rearward swing of said plate.

14. Means for progressively heating plastic caps for bottles, comprising a turret having a series of peripheral slots for supporting a plurality of caps, turret heating means, turret rotating means, means for successively presenting caps to said slots, and a cylindrical sleeve on the periphery and guards on the sides of said turret for retaining caps in said slots during turret rotation.

15. Means for progressively heating plastic caps for bottles, comprising a turret having a series of peripheral slots for supporting a plurality of caps, turret heating means, turret rotating means, means for successively presenting caps to said slots, and a cylindrical sleeve movable on the periphery and guards on the sides of said turret for retaining caps in said slots during turret rotation, the sleeve having a series of slots which may be brought into register with the turret slots to permit removal of caps from the latter.

16. Means for progressively heating plastic caps for bottles, comprising a hollow turret for supporting a plurality of caps and having a hollow hub, concentric pipes projecting into said hub for conducting steam to and from the interior of said turret, means for rotating said turret, and means for successively presenting caps to said turret.

17. Means for progressively crimping flat plastic caps on bottles, comprising a series of bottle supports, cap supports, hood forming and crimping devices, means for producing a traveling movement of said supports and devices, means for producing assembling and crimping coaction of said supports and devices while traveling, and means whereby bottles and caps are successively presented to said supports, said crimping devices each having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

18. Means for progressively crimping flat plastic caps on bottles, comprising a turret, a series of bottle supports, cap supports, hood forming and crimping devices carried by said turret, means for rotating said turret, means for producing assembling and crimping coaction of said supports and devices during turret rotation, and means whereby bottles and caps are successively presented to said supports, said crimping devices each having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

19. Means for progressively crimping flat plastic caps on bottles, comprising a turret, a series of bottle supports, cap supports, hood forming and crimping devices carried by said turret, means for rotating said turret, stationary cams and operative connections for producing assembling and crimping coaction of said supports and devices during turret rotation, and means whereby bottles and caps are successively presented to said supports, said crimping devices each having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

20. Means for progressively crimping flat plastic caps on bottles, comprising a turret, a series of bottle supports, hood forming and crimping devices, and centering devices carried by said turret, means for rotating said turret, means for producing centering coaction of said supports and devices during turret rotation including means for elevating the bottles into engagement with the centering devices, and means whereby bottles and caps are successively presented to said supports, said crimping devices each having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

21. Means for progressively crimping flat plastic caps on bottles, comprising a turret, a series of bottle supports, hood forming and crimping devices, and cap supports carried by said turret, means for rotating said turret, means for producing assembling coaction of said supports during turret rotation including means for elevating the bottles into engagement with caps on said cap supports, and means whereby bottles and caps are successively presented to said supports, said crimping devices each having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

22. Means for progressively crimping flat plastic caps on bottles, comprising a turret, a series of bottle supports, hood forming and crimping devices carried by said turret, means for rotating said turret, means for producing crimping coaction of said supports and devices during turret rotation including means for elevating the bottles into cooperative relationship with said crimping devices, and means whereby bottles and caps are successively presented to said supports, said crimping devices each having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

23. Means for progressively crimping flat plastic caps on bottles, comprising a turret, a series of bottle supports, cap supports, centering devices, hood forming and crimping devices carried by said turret, means for rotating said turret, means for producing centering, assembling and crimping coaction of said supports and devices during turret rotation including means for elevating the bottles into engagement with the centering devices, thence into engagement with caps on the cap supports, and thence into cooperative relationship with the crimping devices, and means whereby bottles and caps are successively presented to said supports, said crimping devices each having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

24. A crimping device for plastic bottle caps, comprising a crimping head provided with a series of radially arranged crimping fingers pivoted thereto and having projecting prongs, an endless spring engaging all the fingers to normally press them toward a common center, actuating means for said head, and a cam-actuated ring surrounding said fingers and adapted to engage said prongs to spread said fingers apart when a cap has been crimped on a bottle.

25. The combination with cap heating means, of a cap magazine, a stacking device receiving caps from said magazine, and means for forwarding caps from said stacking device to said heating means.

26. The combination with cap heating means, of a cap magazine, a stacking device receiving caps from said magazine, and means for forwarding caps from said stacking device to said heating means including a suction device taking caps from said stacking device.

27. The combination with cap heating means, of an open-bottomed twin-cylinder cap magazine, groups of retaining fingers at the bottoms of said cylinders, a stacking device movable upwardly to release said fingers and laterally to alternately receive stacks of caps from said cylinders, and means for forwarding caps from said stacking device to said heating means.

28. The combination with cap heating means, of reciprocating means having two plungers one of which pushes a cold-cap into said heating means and the other of which pushes a hot-cap out of said heating means.

29. The combination with cap heating means, of cap crimping means, a swinging plate receiving hot-caps from said heating means and delivering them to said crimping means, and stripping means for preventing rearward movement of the caps during the rearward movement of said plate.

30. The combination with flat plastic cap hood forming and crimping means, of a bottle conveyor, means for moving bottles off said conveyor, and means receiving bottles from said moving means and delivering them to said crimping means, said crimping means having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

31. The combination with flat plastic cap hood forming and crimping means, of a bottle conveyor, a swinging arm for moving bottles off said conveyor, and a star-wheel receiving bottles from said arm and delivering them to said crimping means, said crimping means having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

32. The combination with flat plastic cap hood forming and crimping means, of a bottle conveyor, and means for moving bottles from said crimping means to said conveyor, said crimping means having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

33. The combination with flat plastic cap hood forming and crimping means, of a bottle conveyor, and a star-wheel for moving bottles from said crimping means to said conveyor, said crimping means having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

34. The combination with flat plastic cap hood forming and crimping means, of a conveyor for moving bottles toward said crimping means, a second conveyor for moving bottles away from said crimping means, means supporting the ends of said conveyors nearest said crimping means, and means for moving said supporting means when bottles of different heights are to be capped to shift the relative positions of said conveyors and said crimping means, said crimping means having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

35. The combination with flat plastic cap hood forming and crimping means, of a conveyor for moving bottles toward said crimping means, a second conveyor for moving bottles away from said conveyor, a slide supporting the ends of said conveyors nearest said crimping means, and means for operating said slide when bottles of different heights are to be capped to shift the relative positions of said conveyors and said crimping means, said crimping means having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

36. The combination with means for advancing a plurality of assembled flat plastic caps and bottles, of means for hood forming and crimping said caps on said bottles while advancing, said crimping means having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

37. The combination with a rotatable turret for advancing a plurality of assembled flat plastic caps and bottles, of means for hood forming and crimping said caps on said bottles while said turret is advancing, said crimping means having a crimping head provided with a series of crimping fingers pivoted thereto and having projecting prongs, means for normally pressing said fingers toward a common center, and a ring surrounding said fingers and adapted to engage said prongs to spread said fingers apart when a cap has been crimped on a bottle.

38. In combination, a holder for articles arranged in a stack, a vertically movable member beneath said holder, means for moving said member upward to a position beneath the stack wherein it will limit the downward movement of the stack when said stack is otherwise free, a pair of clamping members movable horizontally into and out of clamping engagement with articles in the stack, an auxiliary member movable with said vertically movable member and operative to move said clamping members to free the stack as said vertically movable member approaches its uppermost position, and means for moving said clamping members into clamping position as said auxiliary member recedes upon the withdrawal of said vertically movable member from its uppermost position, the stack limiting position of said vertically movable member and the point of engagement of said clamping members with the stack being spaced to leave the article or articles to be freed below said clamping members.

39. In combination, a holder for articles arranged in a stack, a vertically movable article engaging member for controlling the downward movement of articles freed from the bottom of the stack, means for moving said article engaging member upward to an engaging position in which it will limit the downward movement of the stack when said stack is otherwise free, clamping members for engaging the stack above the bottom article to support the stack thereabove when said article engaging member is moved from said limiting position, a vertically movable member actuated by said moving means to open said clamping members while said article engaging member is passing through its said limiting position, and means for closing said clamping members as said article-engaging member passes out of said limiting position.

40. In combination, a holder for articles arranged in a stack, means normally operative to sustain the stack by holding the lowermost article against delivery from said holder, a vertically movable member beneath said holder operative to control the downward movement of delivered articles, a second vertically movable member for positively actuating said sustaining means independently of the articles in said holder, and means for elevating and lowering said members as a unit, said members being relatively positioned so that the upper end of the first will be in article receiving position when the upper end of the second actuates said sustaining means.

41. In combination, a holder for articles arranged in a stack, a vertically movable article engaging member for controlling the downward movement of articles freed from the bottom of the stack, means for moving said article engaging member upward to an engaging position in which it will limit the downward movement of the stack when said stack is otherwise free, and additional article engaging means movable into article retaining and releasing positions in timed relation with the movements of said vertically movable member independently of the presence of articles in said holder, the cooperation of said additional means and said vertically movable member serving as an escapement mechanism to feed the articles, when present in said holder, seriatim from the stack bottom.

42. In combination, a holder for articles arranged in a stack, a vertically movable article engaging member for controlling the movement of articles delivered from the bottom of the stack, means for periodically moving said member to and fro between a receiving position beneath said stack and a delivery point, said member when in its receiving position serving as a stop to limit the downward fall of the liberated stack above it, means for engaging and disengaging said stack to periodically hold and release the same in its downward step by step travel, and means for positively actuating said engaging and disengaging means in timed relation with the movements of said vertically movable member independently of the presence of articles to be fed, whereby when articles are present they will be fed seriatim from the bottom of the stack.

43. The combination with means for heating plastic caps, of means for crimping heated caps on bottles, means whereby caps are presented to said heating means and said crimping means, means for presenting bottles to said crimping means, and mechanism controlled by contact with a bottle in said bottle presenting means for controlling said cap heating means.

44. The combination with means for heating plastic caps, of means for crimping heated caps on bottles, means whereby caps are presented to said heating means and said crimping means, means for presenting bottles to said crimping means, and mechanism controlled by contact with a bottle in said bottle presenting means for controlling said cap heating means, said heating means including means for supporting a plurality of caps, means for heating said supporting means, and means for moving said supporting means.

45. The combination with means for heating plastic caps, of means for crimping heated caps on bottles, means whereby caps are presented to said heating means and said crimping means, means for presenting bottles to said crimping means, and mechanism controlled by contact with a bottle in said bottle presenting means for controlling said cap heating means, said heating means including a turret for supporting a plurality of caps, turret heating means, and turret rotating means.

46. The combination with means for heating plastic caps, of means for crimping heated caps on bottles, means whereby caps are presented to said heating means and said crimping means, means for presenting bottles to said crimping means, and mechanism controlled by contact with a bottle in said bottle presenting means for controlling said cap heating means, said heating means including a turret having a series of peripheral slots for supporting a plurality of caps, turret heating means, and turret rotating means.

47. The combination with means for heating plastic caps, of means for crimping heated caps on bottles, means whereby caps are presented to said heating means and said crimping means, means for presenting bottles to said crimping means, and mechanism controlled by contact with a bottle in said bottle presenting means for controlling said cap heating means, said heating means including a turret having a series of peripheral slots for supporting a plurality of caps, turret heating means, turret rotating means, and means for retaining caps in said slots during turret rotation.

48. The combination with means for heating plastic caps, of means for crimping heated caps on bottles, means whereby caps are presented to said heating means and said crimping means, means for presenting bottles to said crimping means, and mechanism controlled by contact with a bottle in said bottle presenting means for controlling said cap heating means, said heating means including hollow means for supporting a plurality of caps, means for conducting steam to and from the interior of said supporting means, and means for moving said supporting means.

49. The combination with means for heating plastic caps, of means for crimping heated caps on bottles, means whereby caps are presented to said heating means and said crimping means, means for presenting bottles to said crimping means, and mechanism controlled by contact with a bottle in said bottle presenting means for controlling said cap heating means, said heating means including a turret for supporting a plurality of caps, turret heating means, and means for giving said turret a step by step rotating movement.

50. The combination with means for heating plastic caps, of means for presenting caps to said heating means, means for presenting heated caps to means for crimping heated caps on bottles, means for presenting bottles to said crimping means, and mechanism controlled by contact with a bottle in said bottle presenting means for controlling said cap presenting means and cap heating means, said crimping means including a series of bottle supports, cap supports, crimping devices, means for producing a travelling movement of said supports and devices, and means for producing crimping coaction of said supports and devices while travelling.

51. The combination with means for heating plastic caps, of means for presenting caps to said heating means, means for presenting heated caps to means for crimping heated caps on bottles, means for presenting bottles to said crimping means, and mechanism controlled by contact with a bottle in said bottle presenting means for controlling said cap presenting means and cap heating means, said crimping devices including a turret, a series of bottle supports, cap supports and crimping devices carried by said turret, means for rotating said turret, and means for producing crimping coaction of said supports and devices during turret rotation.

52. The combination with means for heating plastic caps, of means for presenting caps to said heating means, means for presenting heated caps to means for crimping heated caps on bottles, means for presenting bottles to said crimping means, and mechanism controlled by contact with a bottle in said bottle presenting means for controlling said cap presenting means and cap heating means, said crimping means including a turret, a series of bottle supports, cap supports and crimping devices carried by said turret, means for rotating said turret, and stationary cams and operative connections for producing crimping coaction of said supports and devices during turret rotation.

53. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said crimping means including a turret, series of bottle supports and centering devices carried by said turret, means for rotating said turret, and means for producing centering coaction of said supports and devices during turret rotation including means for elevating bottles into engagement with the centering devices.

54. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said crimping means including a turret, a series of bottle supports and cap supports carried by said turret, means for rotating said turret, and means for producing assembling coaction of said supports during turret rotation including means for elevating bottles into engagement with caps on said cap supports.

55. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap heating means said crimping means including a turret, series of bottle supports and crimping devices carried by said turret, means for rotating said turret, and means for producing crimping coaction of said supports and devices during turret rotation including means for elevating bottles into cooperative relationship with said crimping devices.

56. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said crimping means including a turret, a series of bottle supports, cap supports, centering devices, and crimping devices carried by said turret means for rotating said turret, and means for producing centering, assembling, and crimping coaction of said supports and said devices during turret rotation including means for elevating bottles into engagement with the centering devices, thence into engagement with the caps on the cap supports and thence into cooperative relationship with the crimping devices.

57. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said crimping means including a turret, a series of bottle supports and crimping devices carried by said turret, said crimping devices each having a crimping head in two parts and provided with a series of radially arranged crimping fingers pivoted between the parts of said head, and an endless spring engaging all the fingers and normally pressing them toward a common center, means for rotating said turret, and means for actuating said support and fingers during turret rotation.

58. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said crimping devices each having a head provided with a series of crimping fingers pivoted thereto and means for normally pressing said fingers toward a common center, means for rotating said turret, and means for actuating said supports and fingers during turret rotation.

59. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said crimping means including a turret, a series of bottle supports and crimping devices carried by said turret, said crimping devices each having a crimping head provided with a series of crimping fingers pivoted thereto and means for normally pressing said fingers toward a common center, means for rotating said turret, means for spreading said fingers apart when a cap has been crimped on a bottle and means for actuating said support and fingers during turret rotation.

60. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said crimping means including a series of bottle supports, a series of crimping devices, and means for varying the normal distance between said supports and devices to enable the machine to operate on bottles of different heights.

61. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said crimping means including a series of bottle supports, a series of crimping devices, a series of cap supports between said bottle supports and said crimping devices, a turret carrying all of said supports and devices, means for rotating said turret and a manually actuated screw operative at the center of said turret for raising or lowering said bottle supports and thus varying the normal distance between them and said crimping devices to enable the machine to operate on bottles of different heights.

62. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said cap presenting means including a cold cap transfer delivering caps successively to said heating means, and means for printing said caps while in said transfer.

63. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said cap presenting means including a pathway leading to said heating means, and means for forwarding caps along said pathway.

64. The combination with means for progressively heating a plurality of plastic caps, of means for progressively crimping a plurality of heated caps on bottles, means whereby caps are presented to said heating means, means for presenting bottles to said crimping means, and mechanism controlled by contact with a bottle in said bottle presenting means for controlling said cap presenting means and cap heating means, said cap presenting means including a pathway leading to said heating means, reciprocating means for forwarding caps along said pathway, and stripping means for preventing rearward movement of the caps during the rearward reciprocation of said forwarding means.

65. The combination with a cap supply and means for progressively heating a plurality of plastic caps, of means for withdrawing caps from said supply, means for progressively crimping a plurality of heated caps on bottles, means whereby caps are presented to said heating means, means for presenting bottles to said crimping means, and mechanism controlled by contact with a bottle in said bottle presenting means for controlling said cap with drawing means said cap presenting means and cap heating means, said cap presenting means including a pathway leading to said heating means, and means for producing a step by step movement of caps along said pathway.

66. The combination with a cap supply and means for progressively heating a plurality of plastic caps, of means for withdrawing caps from said supply, means for progressively crimping a plurality of heating caps on bottles, means whereby caps are presented to said heating means, means for presenting bottles to said crimping means, and mechanism controlled by contact with a bottle in said bottle presenting means for controlling said cap withdrawing means said cap presenting means and cap heating means, said cap presenting means including means for simultaneously loading a cold cap into said heating means and discharging a hot cap therefrom.

67. The combination with a cap supply and means for progressively heating a plurality of plastic caps, of means for withdrawing caps from said supply, means for progressively crimping a plurality of heated caps on bottles, means whereby caps are presented to said heating means, means for presenting bottles to said crimping means, and mechanism controlled by contact with a bottle in said bottle presenting means for controlling said cap withdrawing means said cap presenting means and cap heating means, said cap presenting means including a hot-cap transfer receiving hot-caps from said heating means and delivering them to said crimping means.

68. The combination with a cap supply and means for progressively heating a plurality of plastic caps, of means for withdrawing caps from said supply, means for progressively crimping a plurality of heated caps on bottles, means whereby caps are presented to said heating means, means for presenting bottles to said crimping means, and mechanism controlled by contact with a bottle in said bottle presenting means for controlling said cap withdrawing means said cap presenting means and cap heating means, said bottle presenting means including a conveyor, a swinging arm moving bottles off said conveyor, and a star-wheel receiving bottles from said arm and delivering them to said crimping means.

69. The combination with a cap supply and means for progressively heating a plurality of plastic caps, of means for withdrawing caps from said supply, means for progressively crimping a plurality of heated caps on bottles, means whereby caps are presented to said heating means, means for presenting bottles to said crimping means, and mechanism controlled by contact with a bottle in said bottle presenting means for controlling said cap withdrawing means said cap presenting means and cap heating means, and means for ejecting capped bottles from said crimping means, said ejecting means including a conveyor, and a star-wheel moving bottles from said crimping means to said conveyor.

70. The combination with means for progressively heating a plurality of plastic caps, of means for progressively crimping a plurality of heated caps on bottles, means whereby caps are presented to said heating means, means for presenting bottles to and ejecting them from said crimping means including means for shifting the position of said bottle presenting and ejecting means when bottles of different heights are to be capped, and mechanism actuated by the bottles presented to crimping means for controlling said cap presenting means and cap heating means.

71. The combination with means for progressively heating a plurality of plastic caps, of means for progressively crimping a plurality of heated caps on bottles, means whereby caps are presented to said heating means, means for presenting bottles to and ejecting them from said crimping means including means for shifting the position of said bottle presenting and ejecting means when bottles of different heights are to be capped, and mechanism actuated by the bottles presented to said crimping means for controlling said cap presenting means and cap heating means, said bottle presenting and ejecting means including a conveyor for moving bottles towards said crimping means, a second conveyor for moving bottles away from said crimping means, a slide supporting the end of each conveyor nearest said crimping means, and manually actuated means for operating said slide when bottles of different height are to be capped to shift the relative positions of said conveyors and said crimping means.

72. The combination with means for progressively heating a plurality of plastic caps, of means for progressively crimping a plurality of heated caps on bottles, means whereby caps are presented to said heating means, means for presenting bottles to and ejecting them from said crimping means including means for shifting the position of said bottle presenting and ejecting means when bottles of different heights are to be capped, and mechanism actuated by the bottles presented to said crimping means for controlling said cap presenting means and cap heating means, said mechanism including a skip-cap shoe arranged to bear against a bottle in said bottle presenting means, a clutch connected to said shoe and adapted to be disengaged when no bottle is in position to contact the shoe, and means driven from said clutch for driving said cap heating and cap presenting means.

73. The combination with means for progressively heating a plurality of plastic caps, of means for progressively crimping a plurality of heated caps on bottles, means whereby caps are presented to said heating means, means for presenting bottles to and ejecting them from said crimping means including means for shifting the position of said bottle presenting and ejecting means when bottles of different heights are to be capped, and mechanism actuated by the bottles presented to said crimping means for controlling said cap presenting means and cap heating means, said bottle presenting means including a bottle conveyor, and a rotating star wheel arranged to receive bottles from said conveyor and deliver them to said crimping means, and said mechanism including a skip-cap shoe arranged to bear against a bottle in one of the spaces of said star wheel, a clutch connected to said shoe and adapted to be disengaged when no bottle is in said space in the star wheel to contact the shoe and means driven from said clutch for driving said cap heating and cap presenting means.

74. The combination with means for progressively heating a plurality of plastic caps, of means for progressively crimping a plurality of heated caps on bottles, means whereby caps are presented to said heating means, means for presenting bottles to and ejecting them from said crimping means including means for shifting the position of said bottle presenting and ejecting means when bottles of different heights are to be capped, and mechanism actuated by the bottles presented to said crimping means for controlling said cap presenting means and cap heating means, and means for operating said cap heating means and cap presenting means independently of said mechanism in order to fill up the cap heating means before the bottles are presented to said crimping means.

75. The combination with means for supporting a plurality of caps, of means for applying caps to containers, means for selecting caps for said containers, means for presenting containers to said cap applying means, and means for controlling said selecting means including a clutch and mechanism operated by said clutch, said clutch and mechanism being controlled by a container in said presenting means.

76. The combination with a feeding stack for a plurality of caps, of means for applying caps to containers, a cap selecting device, means to convey caps to a heating mechanism and said applying means, means for presenting containers to said cap applying means, and means for controlling said selecting means including a clutch and mechanism operated by said clutch, said clutch and mechanism being controlled by a container in said presenting means.

77. The combination with means for supporting a plurality of caps, of means for presenting containers, mechanism for feeding caps to said containers, a cap selecting device including a suction head for selecting said caps, means for setting up communication between said suction head and a source of vacuum, and container actuated means for rendering said source of vacuum effective.

RUPERT E. RUNDELL.